(12) United States Patent
O'Connor et al.

(10) Patent No.: US 9,462,325 B2
(45) Date of Patent: Oct. 4, 2016

(54) TIME SHIFTING BY CONCURRENTLY RECORDING AND PLAYING A DATA STREAM

(71) Applicant: Intel Corporation, Santa Clara, CA (US)

(72) Inventors: Dennis M. O'Connor, Chandler, AZ (US); Mark P. Chuang, San Jose, CA (US); Boon-Lock Yeo, Sunnyvale, CA (US); Robert L. Davies, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 14/612,432

(22) Filed: Feb. 3, 2015

(65) Prior Publication Data
US 2015/0147050 A1 May 28, 2015

Related U.S. Application Data

(60) Division of application No. 13/490,675, filed on Jun. 7, 2012, now Pat. No. 8,983,263, which is a division of application No. 12/345,928, filed on Dec. 30, 2008, now abandoned, which is a division of application No.
(Continued)

(51) Int. Cl.
*H04N 5/765* (2006.01)
*H04N 5/78* (2006.01)
(Continued)

(52) U.S. Cl.
CPC ......... *H04N 21/4334* (2013.01); *G11B 27/005* (2013.01); *G11B 27/034* (2013.01); *G11B 27/105* (2013.01); *G11B 27/28* (2013.01); *H04N 5/76* (2013.01); *H04N 5/91* (2013.01); *H04N 21/4147* (2013.01); *H04N 21/4382* (2013.01); *H04N 21/4402* (2013.01);
(Continued)

(58) Field of Classification Search
CPC . G11B 27/005; G11B 27/034; G11B 27/105; G11B 27/28; H04N 21/4147; H04N 21/4334; H04N 21/4382; H04N 21/44008; H04N 21/4402; H04N 5/76; H04N 5/91
USPC .................. 386/232, 231, 323, 326, 239
See application file for complete search history.

(56) References Cited

U.S. PATENT DOCUMENTS 5,040,061 A  8/1991  Yonemitsu
5,134,499 A  7/1992  Sata et al.
(Continued)

FOREIGN PATENT DOCUMENTS

EP  0789488  8/1997
JP  2044569  2/1990
(Continued)

OTHER PUBLICATIONS

"Hitachi Plans Flexible DVD Video Recorder," Electronic Engineering Times, p. 8, Jun. 16, 1997.
(Continued)

*Primary Examiner* — Robert Chevalier
(74) *Attorney, Agent, or Firm* — Trop Pruner & Hu, P.C.

(57) ABSTRACT

A video stream may include portions that are stored while other portions are being displayed. In one embodiment, a portion of the video stream may be stored in digital storage media at one instance while in the next instance another portion of the stream is being read out of the storage media.

12 Claims, 23 Drawing Sheets

Related U.S. Application Data

10/383,459, filed on Mar. 7, 2003, now Pat. No. 7,486,871, which is a division of application No. 09/343,870, filed on Jun. 30, 1999, now Pat. No. 6,591,058, which is a continuation-in-part of application No. 09/150,577, filed on Sep. 10, 1998, now abandoned, which is a continuation-in-part of application No. 08/996,535, filed on Dec. 23, 1997, now Pat. No. 6,480,667.

(51) Int. Cl.

| | | |
|---|---|---|
| H04N 21/433 | (2011.01) | |
| G11B 27/034 | (2006.01) | |
| G11B 27/10 | (2006.01) | |
| G11B 27/28 | (2006.01) | |
| H04N 5/76 | (2006.01) | |
| H04N 21/4147 | (2011.01) | |
| G11B 27/00 | (2006.01) | |
| H04N 5/91 | (2006.01) | |
| H04N 21/438 | (2011.01) | |
| H04N 21/44 | (2011.01) | |
| H04N 21/4402 | (2011.01) | |
| G11B 20/10 | (2006.01) | |
| H04N 5/781 | (2006.01) | |
| H04N 5/85 | (2006.01) | |
| H04N 5/907 | (2006.01) | |

(52) U.S. Cl.
CPC ............. *H04N 21/44008* (2013.01); *G11B 2020/10962* (2013.01); *G11B 2220/218* (2013.01); *G11B 2220/2516* (2013.01); *G11B 2220/2545* (2013.01); *G11B 2220/2562* (2013.01); *G11B 2220/455* (2013.01); *G11B 2220/61* (2013.01); *H04N 5/781* (2013.01); *H04N 5/85* (2013.01); *H04N 5/907* (2013.01)

(56) References Cited

U.S. PATENT DOCUMENTS

| | | |
|---|---|---|
| 5,432,769 A | 7/1995 | Honjo |
| 5,438,423 A | 8/1995 | Lynch |
| 5,479,302 A | 12/1995 | Haines |
| 5,541,738 A | 7/1996 | Mankovitz |
| 5,930,444 A | 7/1999 | Camhi |
| 5,974,218 A | 10/1999 | Nagasaka et al. |
| 6,094,234 A | 7/2000 | Nonomura et al. |
| 6,137,545 A * | 10/2000 | Patel .................. H03D 1/24 348/558 |
| 6,335,730 B1 | 1/2002 | Gould |
| 6,480,667 B1 | 11/2002 | O'Connor |
| 6,778,708 B1 | 8/2004 | Divakaran |
| 7,283,719 B2 | 10/2007 | Okayama et al. |
| 8,295,674 B2 | 10/2012 | Sasaki et al. |

FOREIGN PATENT DOCUMENTS

| | | |
|---|---|---|
| JP | 7264529 | 10/1995 |
| JP | 8-237592 | 9/1996 |
| JP | 10056620 | 2/1998 |
| TW | NI110075 | 4/2000 |
| WO | 9532584 | 11/1995 |

OTHER PUBLICATIONS

CN Patent Office Notice of Allowance in corresponding CN Patent Application No. 98812546.3, Oct. 5, 2007, 4 pages.

EP Search Report in corresponding EP Patent Application No. 06077039.3 dated Nov. 7, 2008, 10 pages.

Indian Patent Office Notice Notice of Grant in corresponding in Patent Application No. 2158CAL98, Apr. 14, 2006, 1 page.

\* cited by examiner

TIME SHIFTING BY CONCURRENTLY RECORDING AND PLAYING A DATA STREAM

CROSS-REFERENCE TO RELATED APPLICATIONS

This is a divisional of U.S. patent application Ser. No. 13/490,675, filed on Jun. 7, 2012, which is a divisional of U.S. patent application Ser. No. 12/345,928, filed on Dec. 30, 2008, now abandoned, which is a divisional of U.S. patent application Ser. No. 10/383,459, filed on Mar. 7, 2003, which issued as U.S. Pat. No. 7,486,871 on Feb. 3, 2009, which is a divisional of U.S. patent application Ser. No. 09/343,870, filed on Jun. 30, 1999, which issued as U.S. Pat. No. 6,591,058 on Jul. 8, 2003, which is a continuation-in-part of U.S. patent application Ser. No. 09/150,577, filed on Sep. 10, 1998, now abandoned, which is a continuation-in-part of U.S. patent application Ser. No. 08/996,535, filed on Dec. 23, 1997, which issued as U.S. Pat. No. 6,480,667 on Nov. 12, 2002.

BACKGROUND

This present invention relates to the recording and playing back of a video stream. A video stream includes any combination of audio and/or video data streams.

Video streams have typically been recorded on analog media such as a video cassette. A video cassette recorder (VCR) is used to record the video stream on the video cassette. The video stream may come via a broadcast signal, via cable, via satellite signal, or from another video playback device. Once the video stream has been recorded, the VCR is used to rewind the recording medium and play what was recorded. However, due to the nature of the analog medium, once the VCR has started recording, it is not possible to play back the portion of the video stream that has already been recorded until the recording session is terminated.

Thus, there is a need for an improved way of recording portions of a video transmission.

SUMMARY

In accordance with one embodiment, a method of displaying and recording a video transmission includes requesting scene change time information. The scene change time information is used to identify scenes in stored video information.

In accordance with another embodiment, a method of detecting scene changes in video and audio information includes using a first technique to identify a scene change. Audio information is used to assist in identifying a scene change.

In accordance with another embodiment, a method of detecting scene changes in compressed video information includes identifying scene change information developed by the algorithm used to compress said video information. That scene change information is used to identify scene changes. The location of the scene change is marked to facilitate identifying the video frame where the scene change occurs.

In accordance with another embodiment, a method for identifying whether digital or analog video information has been received includes attempting to demodulate the information using a digital technique. Based on the results of the demodulation attempt, the format of the information is determined.

In accordance with another embodiment, a method of storing and playing digital video information includes receiving a plurality of programs on a single channel. Each of said programs is stored in association with an identifier. A first program is played and then stopped. The identifier and the point when the play is stopped is stored. A second program is played.

DETAILED DESCRIPTION

Figure 1:
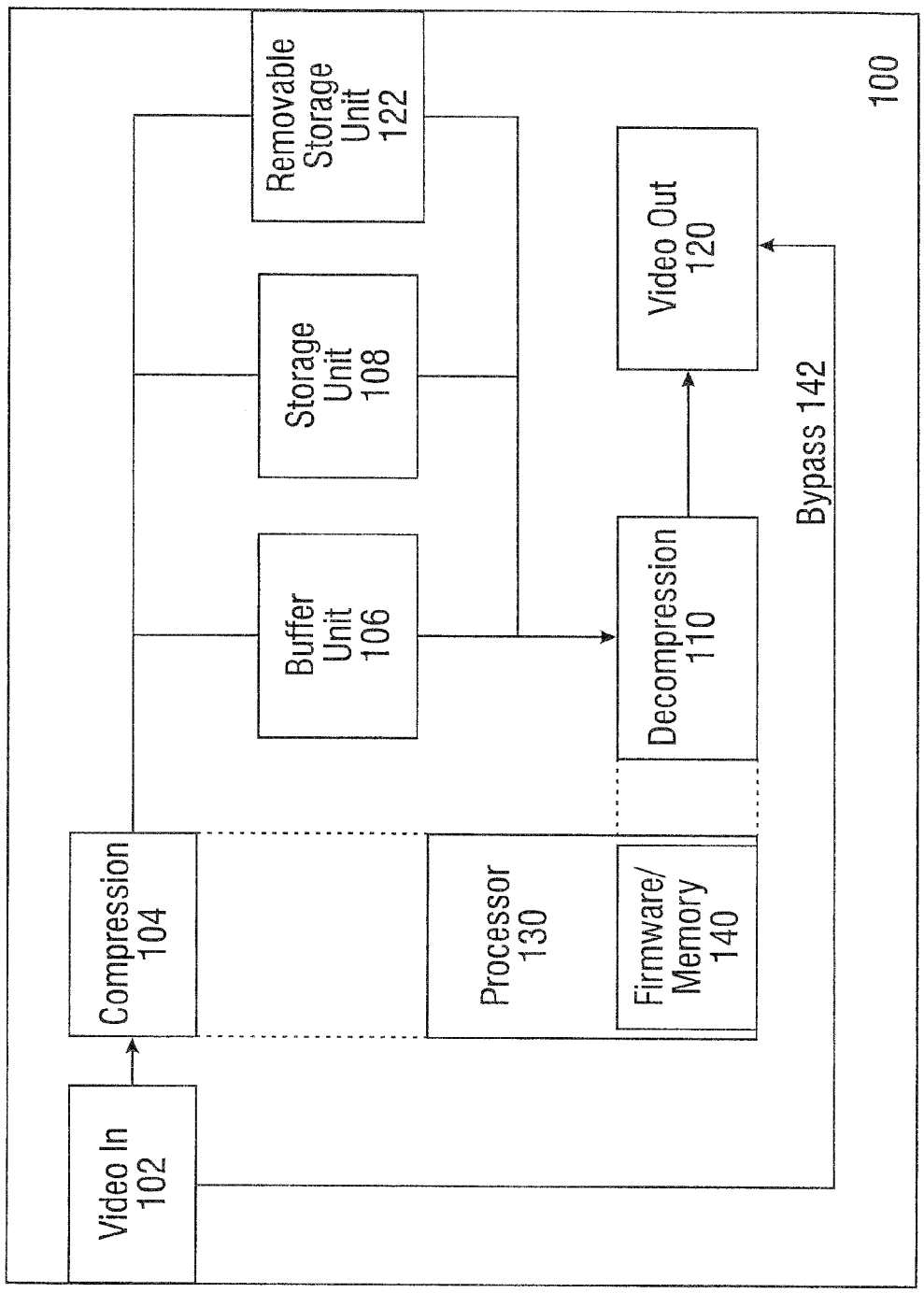
FIG. 1 is a block diagram of a video record and playback system in accordance with one embodiment of the invention.

FIG. 1 shows a block diagram of a video record and playback system 100 in accordance with one embodiment of the invention. A video stream is received at the video input port 102. The video stream may be provided by a camera, a television signal, broadcast, cable, or satellite signals, or another video playback device. In one embodiment, an analog-to-digital conversion may be performed on an analog video stream to form a digital video bit stream. In a different embodiment, the video is already in digital form. The video record and playback system 100 may be part of a system, such as a computer system or set top box, such that the video input port 102 may be part of a video capture card in the computer system or set top box.

The digital video stream from the video input port 102 is optionally compressed at compression unit 104. In one embodiment, the video is already compressed and no further compression is needed. The video stream is then stored in the storage unit 108. A buffer unit 106 may be used as temporary storage for providing larger sequential blocks of video data to the storage unit 108. In one embodiment, the buffer unit 106 comprises a random access memory that allows relatively quick access to any portion of the stored video stream.

The video stream is played back by reading the video stream from the storage unit 108. If the video stream was compressed in compression unit 104, then a decompression unit 110 decompresses the retrieved video stream. The video stream is provided from a video output port 120, to a monitor or other display device such as a TV to provide sound and/or video to a user.

A removable storage unit 122 may also be included in video record and playback system 100, Examples of removable storage units include a writeable compact disk read only memory (CD-ROM), writeable digital video disk (DVD), a flash memory, or another hard disk. The availability of a removable storage unit 122 allows a user to transfer a recording of a video stream stored in storage unit 108 to the removable storage unit 122 and then to transfer the unit 122 to another system at a different location.

In one embodiment, a processor 130 controls the operations of the video record and playback system 100. The compression unit 104 and decompression unit 110 may be implemented in hardware, or the compression and decompression functions of units 104 and 110 may be performed by the processor 130. Processor 130 receives instructions from firmware/memory 140, using technology that is well known.

Figure 2:
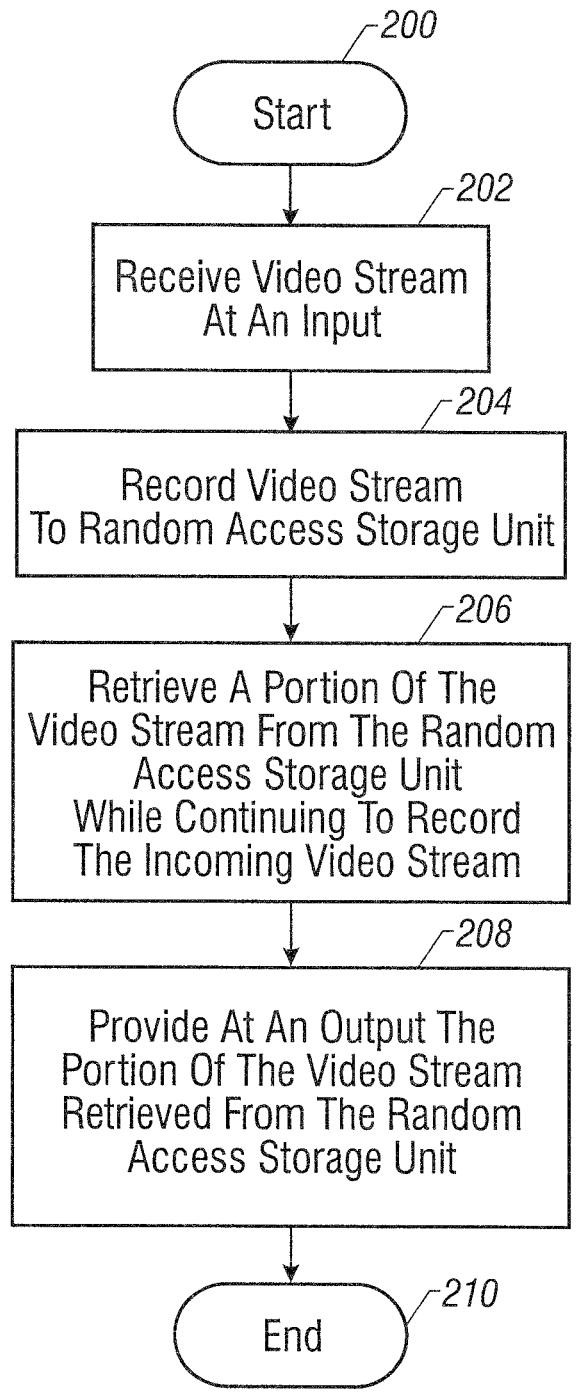
FIG. 2 is a flow chart of one embodiment of the method of providing a time-shifted video stream in accordance with the invention.

FIG. 2 shows a flow chart of an embodiment of a method of providing a time-shifted video stream in accordance with the present invention. The flow chart begins at block 200, and continues at block 202 where the video stream is received. The recording of the video stream begins at block 204. At block 206, playback of the recorded video stream is performed by retrieving a portion of the video stream from the random access storage unit while the recording of the incoming video stream continues. The retrieved portion of the video stream may be time-shifted from the incoming video stream by a time delay. At block 208, the portion of the video stream retrieved from the random access storage unit is retrieved for display by a television or other display device.

In this way, the record and playback functions are decoupled from one another. The user may now begin watching a recorded TV show from the beginning, e.g., prior to the show being completely recorded.

Figure 3:
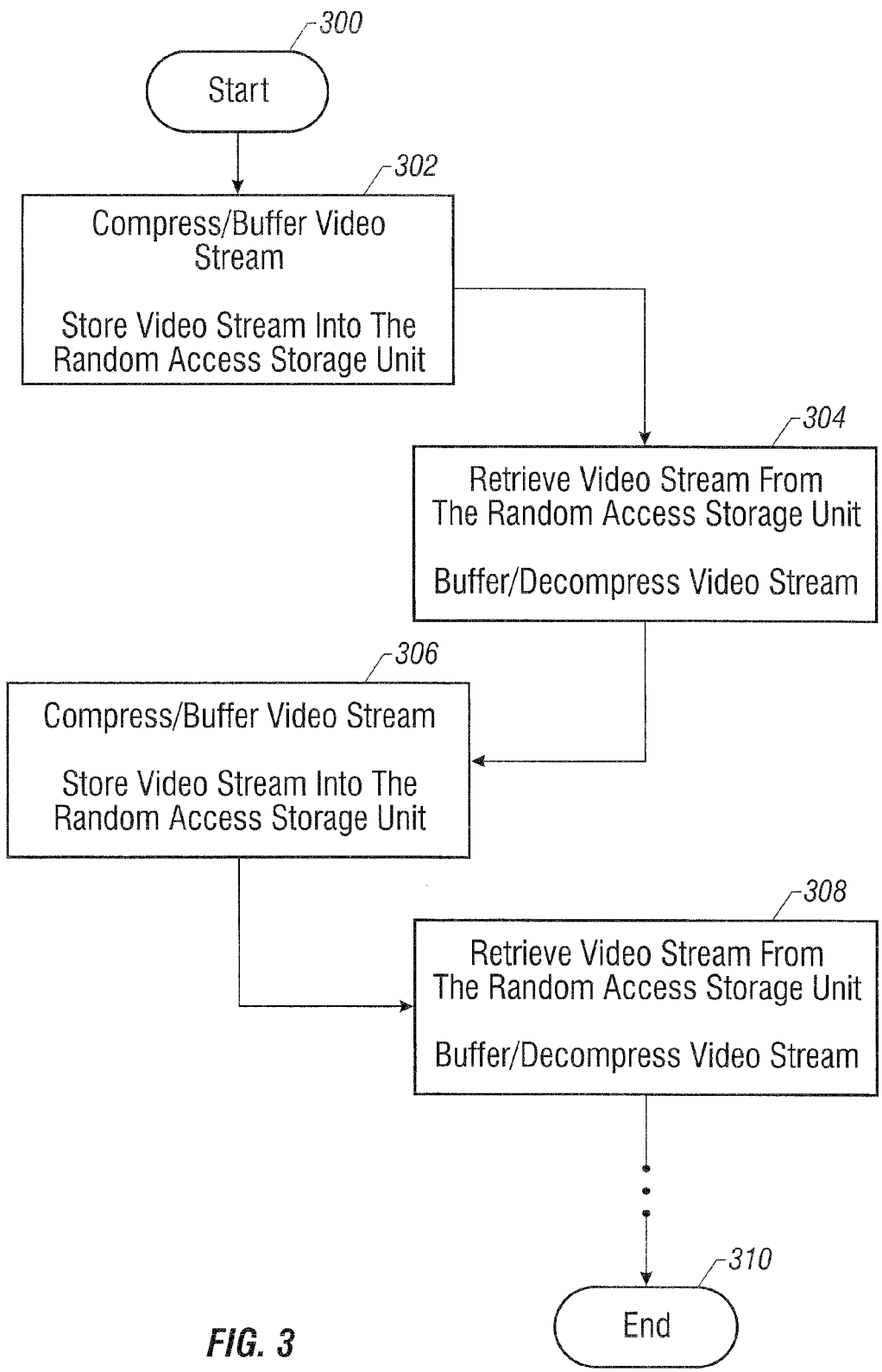
FIG. 3 shows one embodiment of performing block 206 of FIG. 2.

FIG. 3 shows an embodiment of a method for retrieving a portion of the video stream from the random access storage unit while continuing to record the incoming video stream in accordance with the invention, although the invention is not restricted to this embodiment. In the disclosed embodiment, the substantially simultaneous recording and playback of the video stream is performed by multiplexing or alternately storing the video stream to the random access storage unit and reading of the video stream from the random access storage unit. The multiplexed or alternated stores and reads may occur quickly enough that the user does not notice an appreciable delay in the playback of the video stream, and the incoming video stream is not lost, e.g., all of the video stream is recorded. Thus, the record and playback are substantially simultaneous from the user's point of view.

In one embodiment, the random access storage unit comprises a hard disk. The retrieval of the time-shifted video signal from the hard disk is performed at a first physical location (or sector) of the hard disk, and the storing to the hard disk of the incoming video stream is performed at a different physical location (or sector) on the hard disk. Because it takes more time to jump back and forth between different sectors of the hard disk than to read and write to sequential locations in the same sector, data may be buffered to reduce the number of accesses to and from the hard disk using buffer 106. This increases the amount of data transferred per access.

Additionally, because of time constraints for reading and writing to the hard disk, data may be compressed and decompressed to speed transfers to and from the hard disk.

In block 302, the video stream is stored in a random access storage unit. The video stream is optionally compressed and/or buffered prior to storage. In block 304, the video stream is retrieved from the random access storage unit. Buffering and/or decompression may be performed before providing the retrieved video stream to the video output port 120.

The next portion of the video stream is stored (block 306) as described in block 302. At block 308, the next portion of the video stream is retrieved as described in block 304. This process is repeated until either the recording or playback cycle is terminated.

Figure 4:
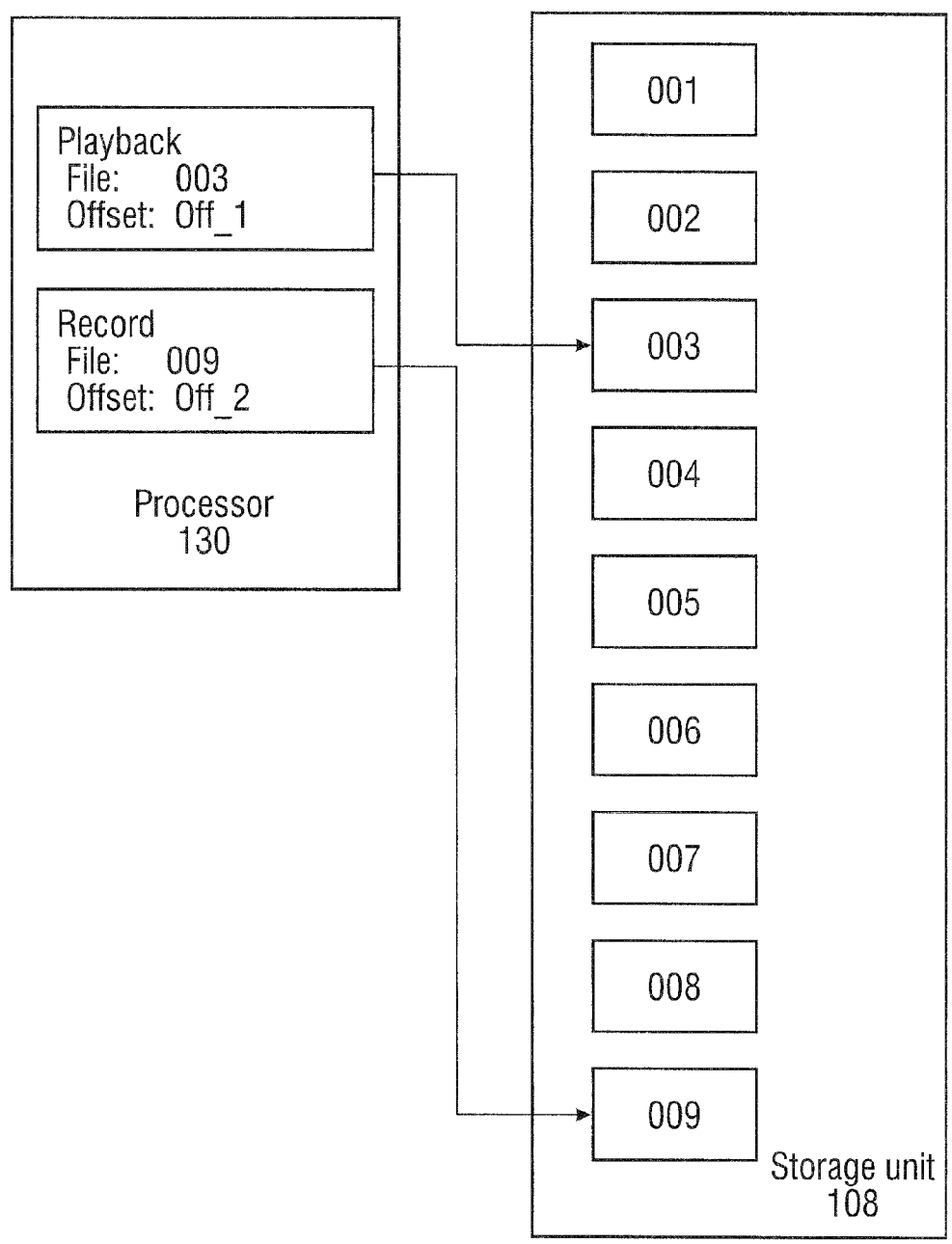
FIG. 4 shows one embodiment of an apparatus for storing the video stream on a hard disk in accordance with the invention.

FIG. 4 shows one embodiment of an apparatus for storing the video stream in the storage unit 108 in accordance with the invention. Again, the invention is not restricted in scope to the illustrated embodiments. In this embodiment, the video stream is stored as separate files 001 and 009 on a hard disk, for example. The processor 130 keeps track of the file and offset into the file of the data being played back, as well as the file and offset into the file of the data being recorded. If the random access storage unit is fast enough, more than one video stream may be recorded and played back at the same time.

Due to the nature of the random access storage unit being capable of easily recording over itself, the random access storage unit may act as a temporary buffer for recording the latest portion, or X number of minutes, of an incoming video stream, where X is set up based upon the size of the storage unit in this particular embodiment. In one embodiment, X could be set up to be the entire storage unit. As newer portions of the video stream are received, they overwrite the older portions of the video stream saved in the random access storage unit. In this manner, the temporary buffering of the video stream acts as a circular buffer. In one embodiment, the processor 130 maintains pointers to the beginning and ending points of the temporary buffer. The processor 130 reassigns the pointers as newer portions of the video stream are received and/or older portions of the video stream are overwritten.

Figure 5:
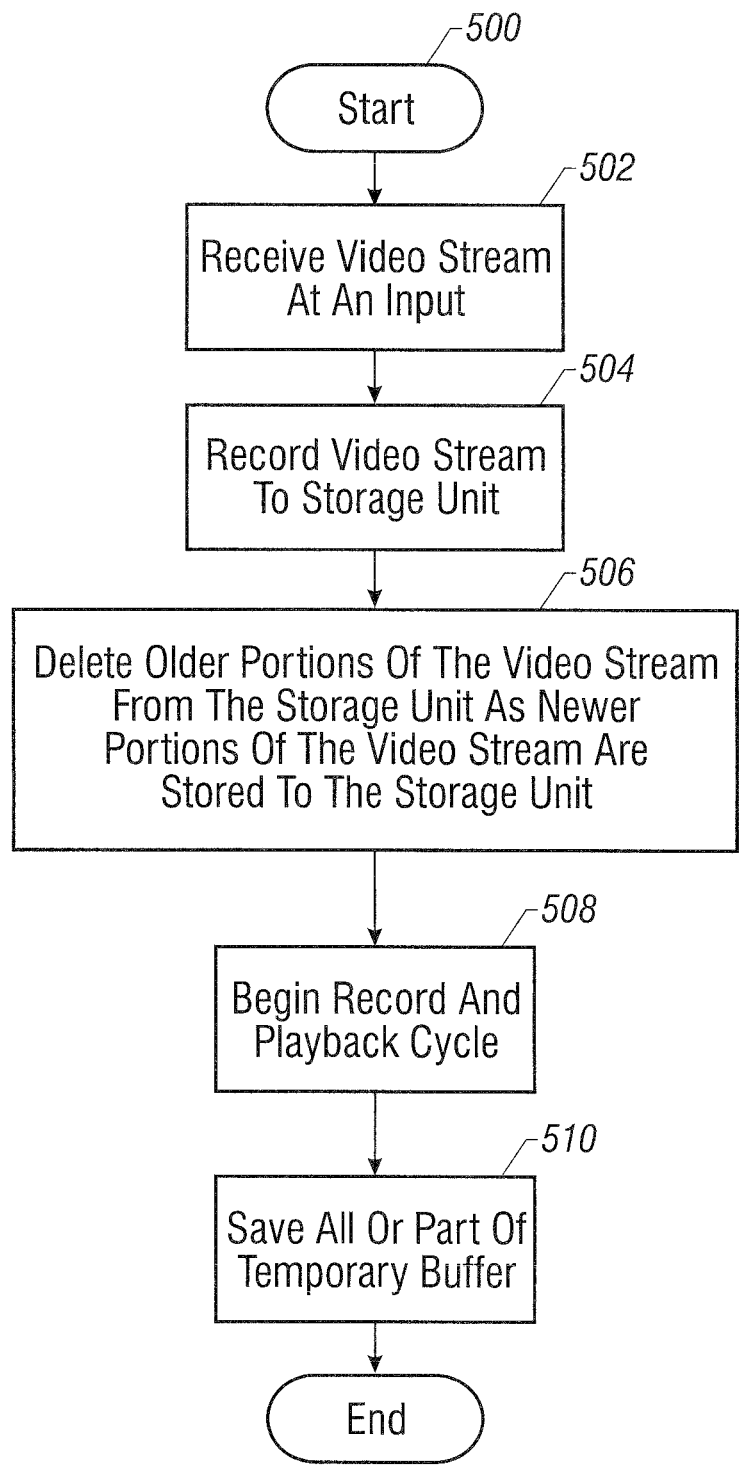
FIG. 5 shows an embodiment of a method of using the storage unit as a temporary buffer in accordance with the invention.

FIG. 5 shows a flow chart 500 of an embodiment of one method for using a temporary buffer in accordance with the invention. At block 502, the video stream is received at an input. Recording of the video stream to the storage unit begins at block 504. At block 506, older portions of the video stream are deleted as newer portions of the video stream are stored to the storage unit.

A user may initiate a playback cycle following block 506. For example, this may occur when the user wishes to re-view a video clip that he just saw. In one embodiment, the user stops recording to the temporary buffer and plays back the last portion of the temporary buffer.

However, it may be more desirable to the user to be able to continue recording as shown at block 508. A record and playback cycle (as described with respect to FIG. 2) is started, in which the incoming video stream is recorded while the user re-views the last portion of the temporary buffer. In this manner, after re-viewing the desired video clip, the user can resume sequentially watching the video stream from the current point of the incoming video for substantially simultaneous playback and record.

At block 510, after the record and playback cycle is completed, all or part of the temporary buffer may be saved. Since the temporary buffer stores the latest X minutes of the video stream prior to the record and playback cycle, all or part of the temporary buffer may be allocated to the portion of the video stream saved during the record and playback cycle. Other portions of the video stream may then be deleted from the storage unit, or they may be marked as overwriteable and used as a new temporary buffer.

Figure 6:
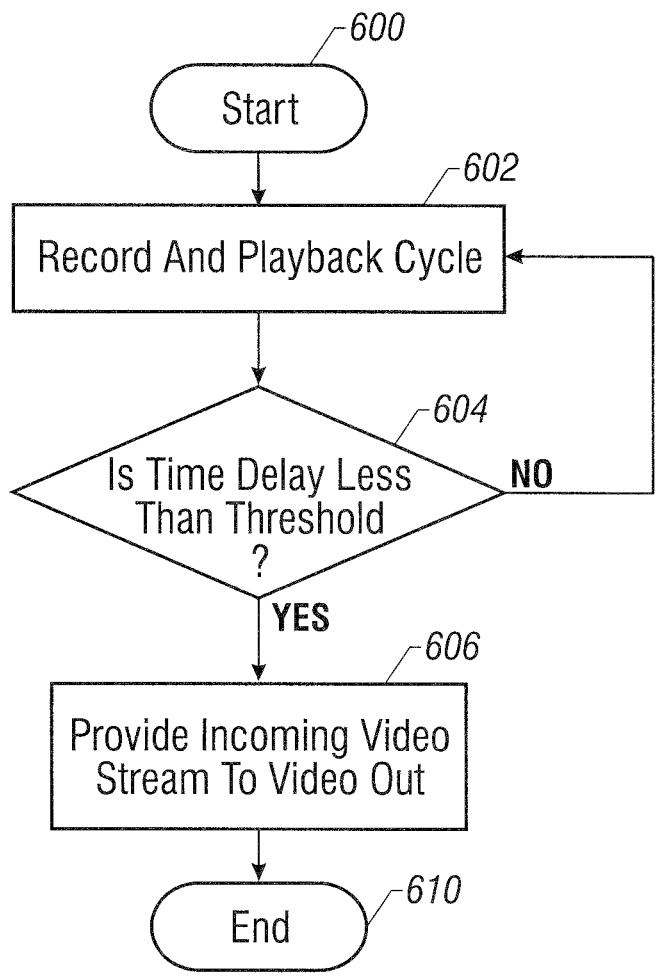
FIG. 6 is a flowchart of the playback of a video stream catching up to the incoming video stream for one embodiment of the invention.

FIG. 6 illustrates an embodiment of a method for playing back a video stream to allow the playback to catch up to the incoming video stream in accordance with the invention. If the playback is performed at an overall rate faster than the rate at which the incoming video stream is received, then the playback may catch up to the incoming video stream.

For example, playback of the video stream may have an overall rate faster than the rate of the incoming video stream if the playback is fast forwarded, or if segments of the playback are skipped altogether. When the time delay of the time-shifted video stream being played back falls below a certain threshold, the video and playback system 100 will cease providing the time-shifted video stream from the storage unit. Instead, the incoming video stream will be provided to the video output port 120 directly. In one embodiment, a bypass 142, as shown in FIG. 1, allows the incoming video stream to be provided to the video output port 120 directly.

When this happens, the user has caught up to the "live" broadcast, e.g., the incoming video stream in this embodiment. The user may terminate the recording cycle, if he wishes. Alternatively, the user may put the video record and playback system 100 back into the temporary buffering mode in which only the latest portion of the video stream is stored.

Figure 7:
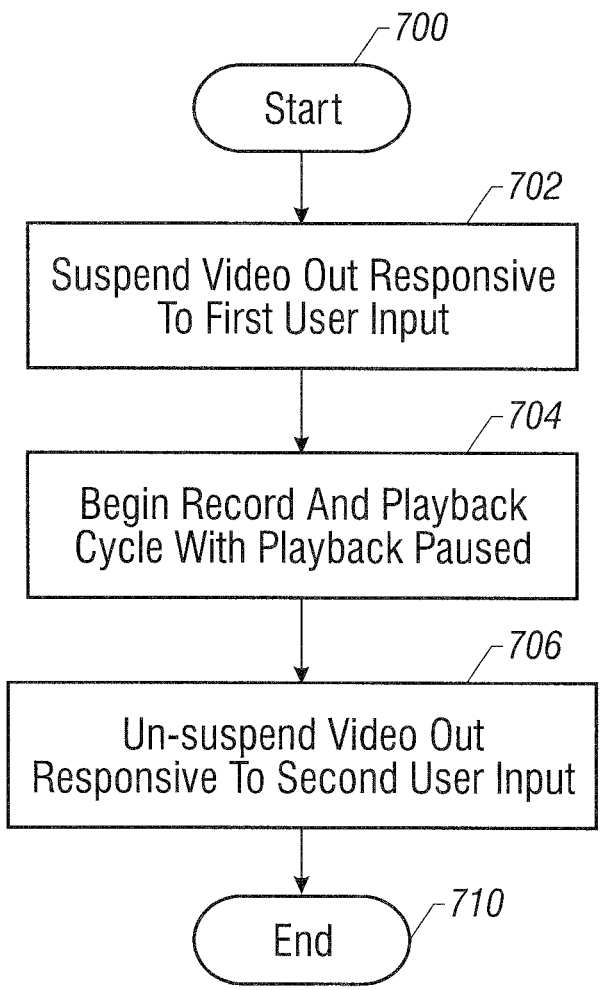
FIG. 7 shows another embodiment, in which the user is able to suspend the display of the incoming video stream in accordance with the invention.

FIG. 7 shows an embodiment in which the user is able to suspend the display of the incoming video stream. This can be used for example, when the user is interrupted, and wishes to continue viewing the video stream after the interruption. When interrupted, the user signals to the video stream and playback system 100 to suspend the display of incoming video stream. This can be done via a remote control, for example. At block 702, the video output signal is suspended. In one embodiment, the video output port continues to provide a still image of the image present at the instance when the suspend was encountered.

At block 704 the incoming video stream is recorded but is not displayed to the monitor. Instead the playback is paused at the point at which the user indicated that the incoming video stream be suspended. When the user is ready to view the video stream again, he can signal the video record and playback system 100 to un-suspend the video stream so that it plays back from the point at which the video stream was suspended, as shown in block 706.

The user may then view the video stream time shifted by the amount of time that he suspended the incoming video stream, or he may fast forward (or rewind) through the time-shifted video stream. When playback of the time-shifted video stream catches up to the point at which the incoming video stream is being recorded, the record and playback system 100 may display the incoming video stream directly from incoming video stream without retrieving the video stream from the storage unit, as described with respect to FIG. 6. The recording of the video stream may then be terminated by the user, if desired.

Employing a random access storage unit for storage of the video stream facilitates jumping to various points within the video stream. One way of jumping is by retrieving different time slices of the video stream. For example, an image frame from the video stream can be retrieved from the storage unit at 1 minute intervals from a current position of the video stream. In one embodiment, an image frame at the current playback position+1 minute, current playback position+2 minutes, and so forth are retrieved and displayed on the TV screen in a mosaic pattern.

Figure 8:
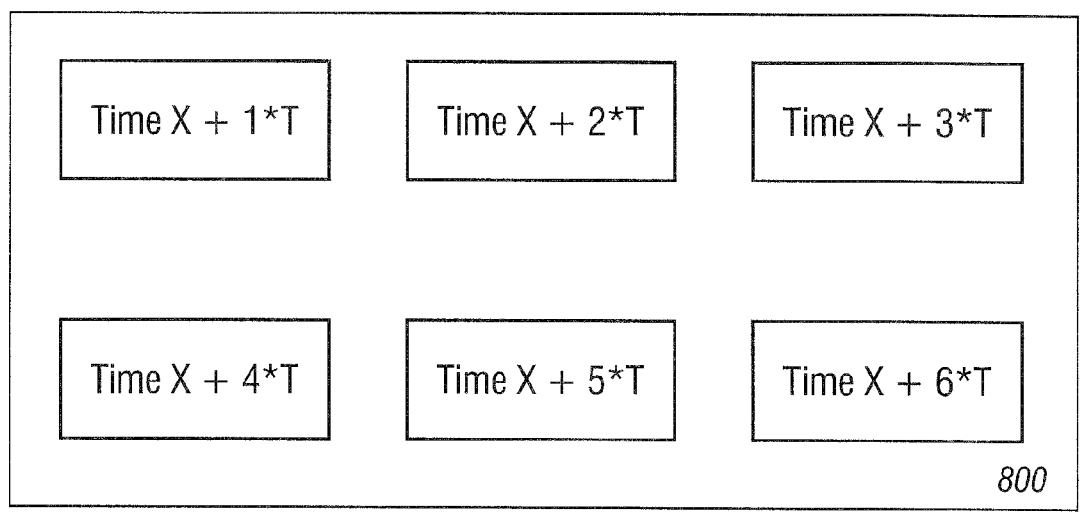
FIG. 8 shows an example of an embodiment of a display screen with several image frames taken at different times in accordance with the invention.

FIG. 8 shows an example of a display screen 800 which displays several image frames taken from the video stream at different times. In FIG. 8, the current playback position is designated as X. In one embodiment, the time interval, T, is user programmable. The intervals may be multiples of the time interval, as shown. A small interval may be used if the user wishes to skip a commercial, which usually lasts only a few minutes. Longer intervals such as a half hour may be useful for determining which movies are recorded on a storage unit.

After the image frames are displayed, the user is able to select one of the frames as a new starting point at which to begin an operation, such as a playback or record operation. By using such a story boarding method, it is easy for a user to quickly jump to a desired location within the video stream.

In one embodiment, the record and playback system 100 is able to detect a black screen or fade out, such as those which accompany the beginning or end of a commercial. This is useful in editing a video stream. The system may also record a series of cue points (e.g., fade outs and fade to black) for later reference.

Having the video stream stored on a random access storage unit such as a hard disk allows for easy editing of the video stream. Individual frames of the video stream may be deleted or replaced. For example, a commercial may be replaced by a fade-to-black sequence.

Once the video stream on the storage unit has been edited, it can be stored to a more permanent medium, such as a writeable CD-ROM, flash memory, or another hard disk via the removable storage unit 122.

Figure 9:
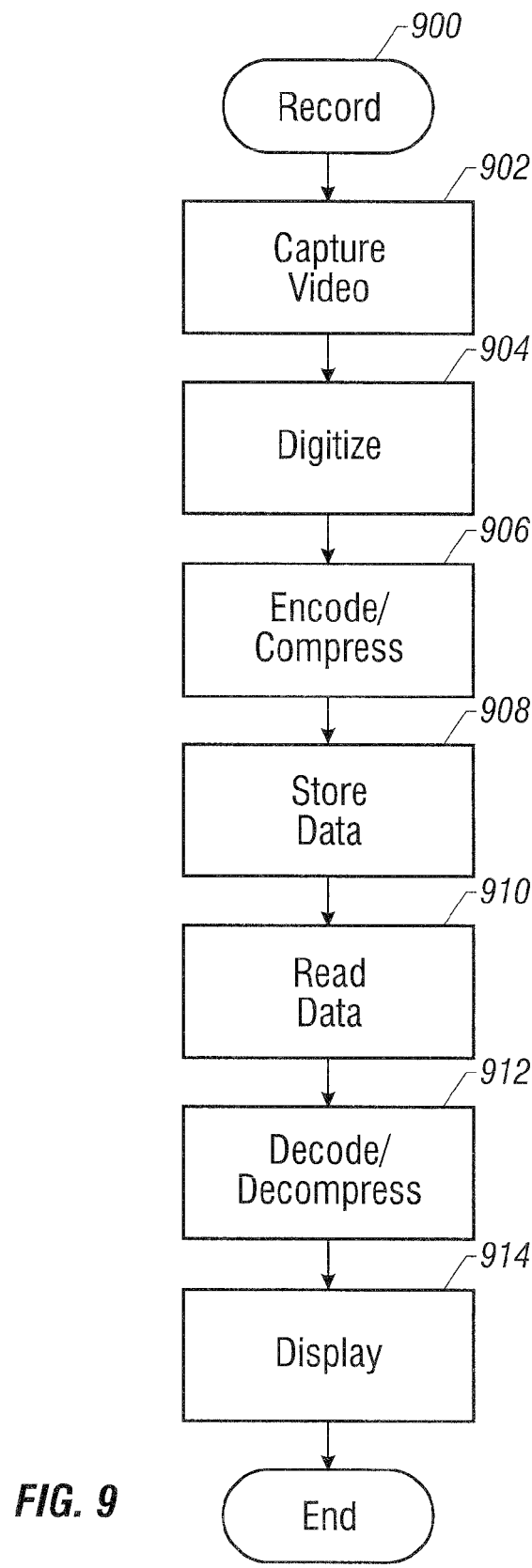
FIG. 9 is a flow chart showing one embodiment of a system for recording and playing back a video stream in accordance with the invention.

Referring now to the embodiment shown in FIG. 9, a flow chart 900 for digitally recording a video stream in accordance with an embodiment of the invention begins by capturing the video stream as indicated in block 902. If the stream is an analog stream, it may be digitized in an analog-to-digital conversion process as indicated at block 904. Next the digital stream may be encoded and compressed, for example using the MPEG2 compression scheme, as indicated in block 906. The stream is alternately read, as indicated at block 910, and stored, as indicated in block 908, in a conventional storage device such as a hard disk drive, a digital video disk or a flash memory. Data that is read from the storage device may be decoded and decompressed using conventional technology, for example, as indicated in block 912, for display as indicated in block 914.

Figure 10:
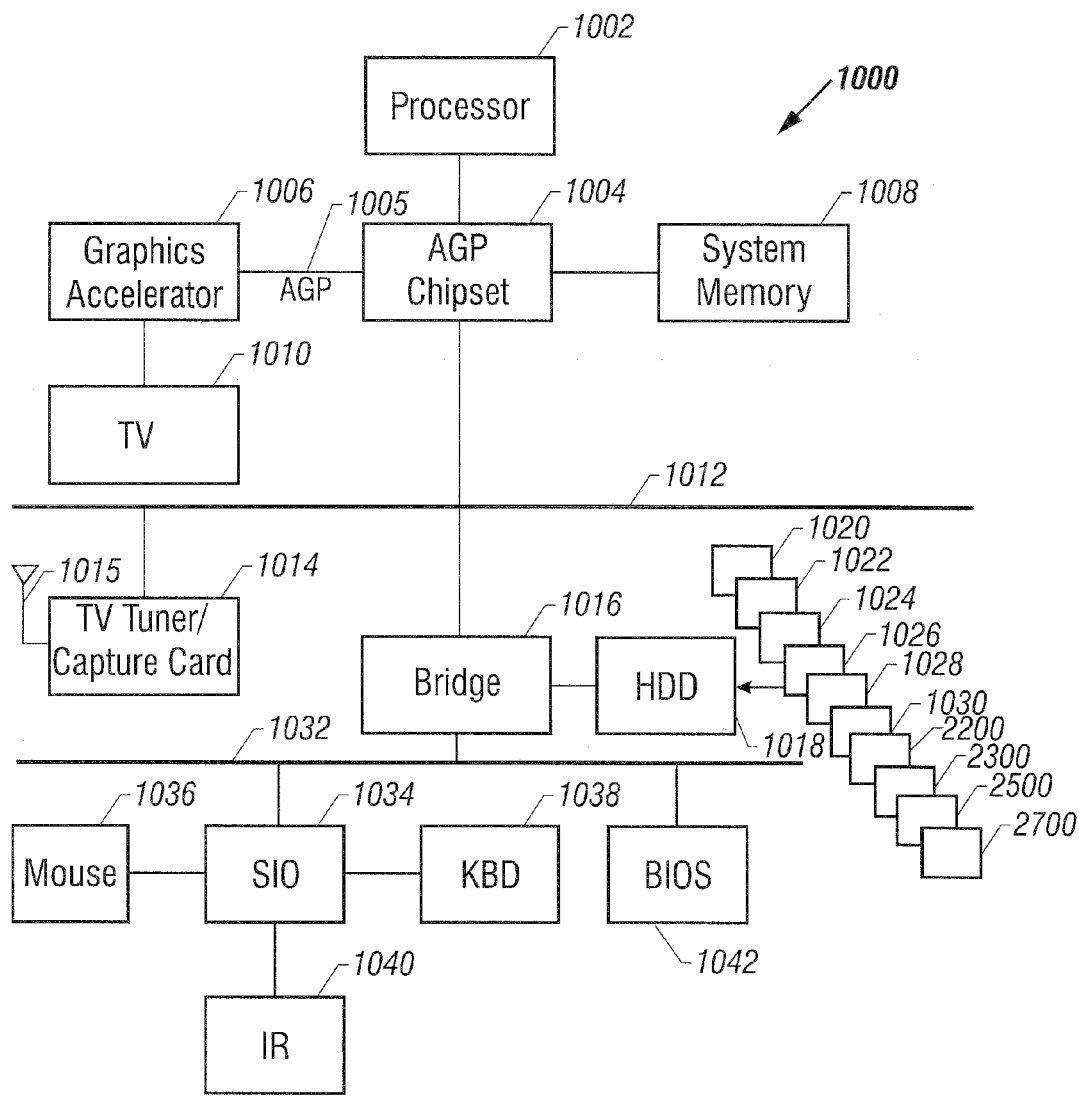
FIG. 10 is a block diagram of a computer system useful in implementing one embodiment of the present invention.

A system 1000 in accordance with one embodiment of the present invention, shown in FIG. 10, includes a processor 1002. In one embodiment, the processor may be coupled to an accelerated graphics port (AGP) chipset 1004 for implementing an accelerated graphics port embodiment. The chipset 1004 communicates with the AGP port 1005 and the graphics accelerator 1006. The television 1010 may be coupled to the video output of the graphics accelerator 1006. The chipset 1004 accommodates the system memory 1008. The chipset 1004 is also coupled to a bus 1012 which may be, for example, a peripheral component interconnect (PCI) bus (PCI Local Bus Specification, Version 2.1 Jun. 1, 1995). The bus 1012 couples to TV tuner/capture card 1014 which is coupled to an antenna 1015 or other video input port, such as a cable input port, a satellite receiver/antenna or the like. The TV tuner and capture card 1014 selects a desired television channel and also performs the video capture function (block 902, FIG. 9). One example of video capture card is the ISVR-III video capture card available from Intel Corporation.

The bus 1012 is also coupled to a bridge 1016 which couples a hard disk drive 1018. The software 1020, 1022, 1024, 1026, 1028, 1030, 2200, 2300, 2500 and 2700 may be stored on the hard disk 1018. The bridge 1016 is also coupled to another bus 1032. The bus 1032 may be coupled to a serial input/output (SIO) device 1034. The device 1034 is in turn coupled to conventional components such as a mouse 1036, a keyboard 1038, and an infrared interface 1040. Also coupled to the bus 1032 is a basic input/output system (BIOS) 1042.

Figure 11:
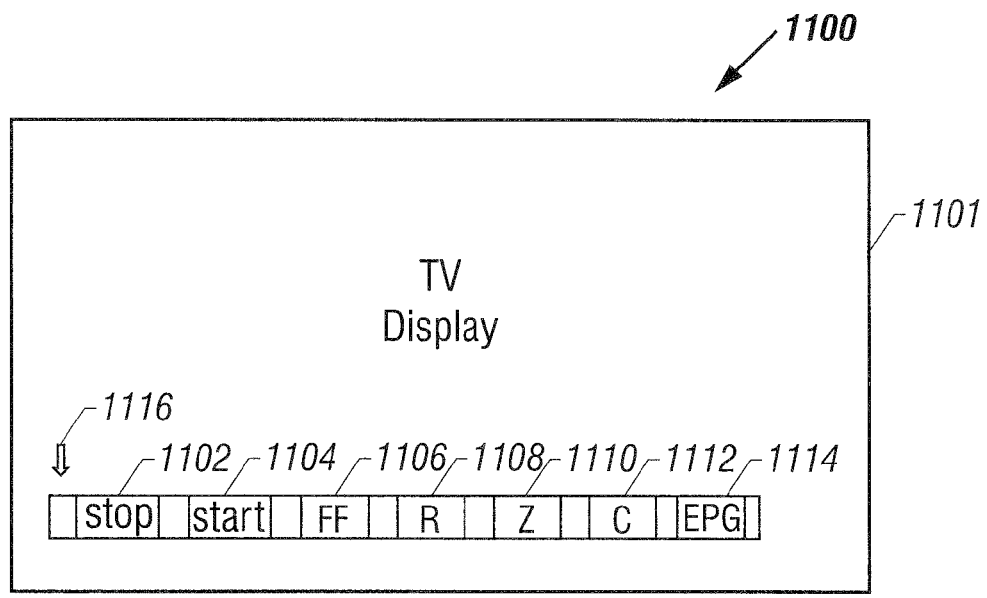
FIG. 11 is an exemplary TV display for implementing an embodiment of the present invention.

An example of a display 1100, shown in FIG. 11, for the television 1010 may display a conventional television picture or program 1101 and, in addition, may have superimposed over the screen, in a discrete fashion, a mouse selectable series of icons, such as the icons 1102 through 1114. When the mouse cursor 1116 selects the appropriate one of the icons, a corresponding feature may be implemented. Among the features that may be implemented in this fashion include a pause or stop function 1102, a start record function 1104, a fast forward function 1106, a rewind function 1108, and a 10 second replay function 1110 which winds back 10 seconds (or some other amount) and replays, and a catchup function 1112 that begins playing back recorded content at a faster than normal rate until the display catches up with a live broadcast and an electronic program guide 1114. The above described functions 1102, 1104, 1106, 1108, 1110, and 1112 may also be individual buttons on a remote control unit.

Figure 12:
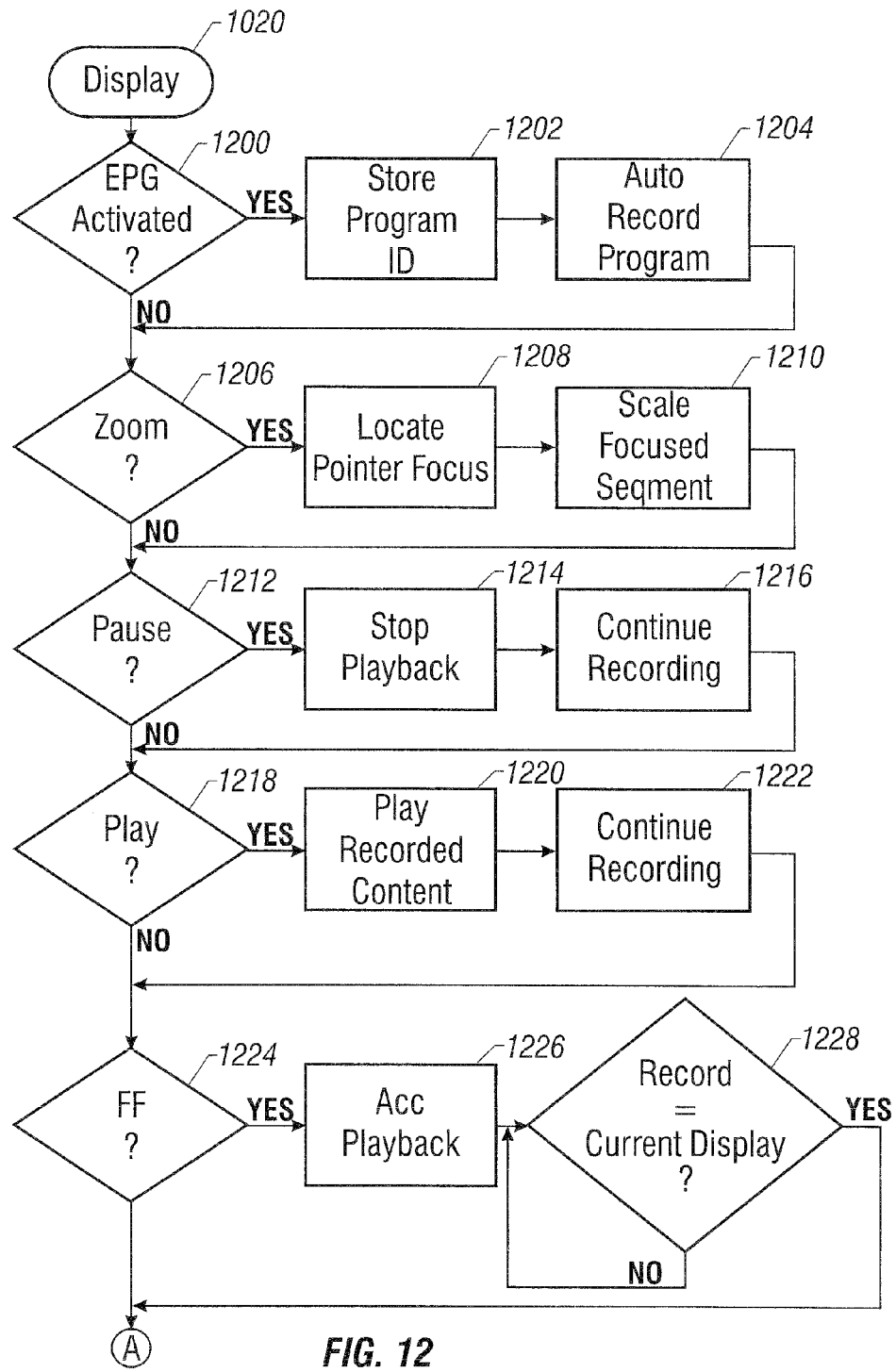
FIG. 12 is a flow chart showing the operation of another embodiment of the present invention.

Referring next to FIG. 12, a program 1020 called display is used to control various features implemented by the computer 1000. Initially a check is made at diamond 1200 to determine if an electronic programming guide (EPG) is implemented. An electronic programming guide is an electronic depiction of the various programs that are available at different times. The electronic programming guide can be provided on a disk, over a modem, by an Internet connection. An electronic programming guide can also be implemented using an interactive broadcasting transmission such as Intercast® 2.0 interactive broadcasting software available from Intel Corporation although the invention is not limited in scope in this respect.

If a particular television program is selected (even if the program is only selected for viewing) on the EPG, an identifier for that particular program may be stored, in one embodiment, as indicated at block 1202, and automatic recording of the program begins (block 1204). In this way the stored version of the program is available to implement the various features described herein even if the storage function was not particularly requested. Because the information is stored in an overwriting fashion, no harm is done by recording the information even if the information turns out not to be useful.

Figure 17:
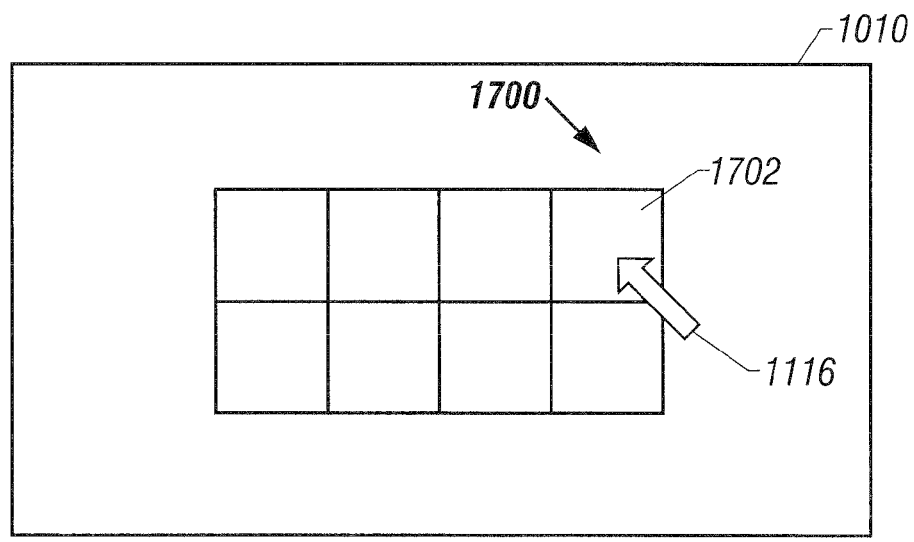
FIG. 17 shows a display with an electronic program guide in accordance with one embodiment of the present invention.

Referring to FIG. 17, an electronic program guide user interface 1700 may be deployed on the television 1010. When the user mouse clicks a box image 1702, representing a given television program, using the cursor 1116, that program is automatically recorded.

Continuing in FIG. 12, an inquiry (diamond 1206) checks whether the user has selected the zoom feature for playback. If the user presses a zoom button during playback, a zoom feature is implemented in one embodiment. In one embodiment, five predefined quadrants in the television display may be defined including four quadrants located peripherally around a central quadrant. When the user selects the zoom feature the user indicates the appropriate quadrant for the zoom (block 1208). The selected quadrant is scaled (block 1210) to produce a larger (zoom) picture.

Referring to block 1208, the pointer focus is identified to determine which quadrant will be zoomed. That quadrant is then scaled as indicated at block 1210. Because the television program is continually being stored, the scaling can be implemented without any loss of continuity of the television picture. After the user has completed looking at the zoomed depiction, the user can return to the program at the point where he or she departed to view the zoomed depiction. Thereafter, the displayed depiction viewed by the user may be time delayed from the actually broadcast program. However the user is able to view the program in its entirety even if slightly time delayed.

Next, a query is made at diamond 1212 to determine whether a pause function has been selected. If so, the playback is stopped as indicated at block 1214 but recording continues unabated as shown in block 1216.

The next check determines whether the play feature has been selected (block 1218). If so the recorded content is played thereby terminating the paused display. However, while the recorded content is displayed, recording continues as indicated in block 1222 so that the recorded content may be eventually displayed without disrupting the continuity of the program.

A query finds out if the fast forward feature has been implemented as indicated in diamond 1224. If so, a fast playback is implemented as shown in block 1226. Once the playback equals the current broadcast or program content (diamond 1228), the flow returns to display current broadcast or program content. The fast forward may progress at 300 to 400% (or some other speed) of normal playback speed.

Figure 12A:
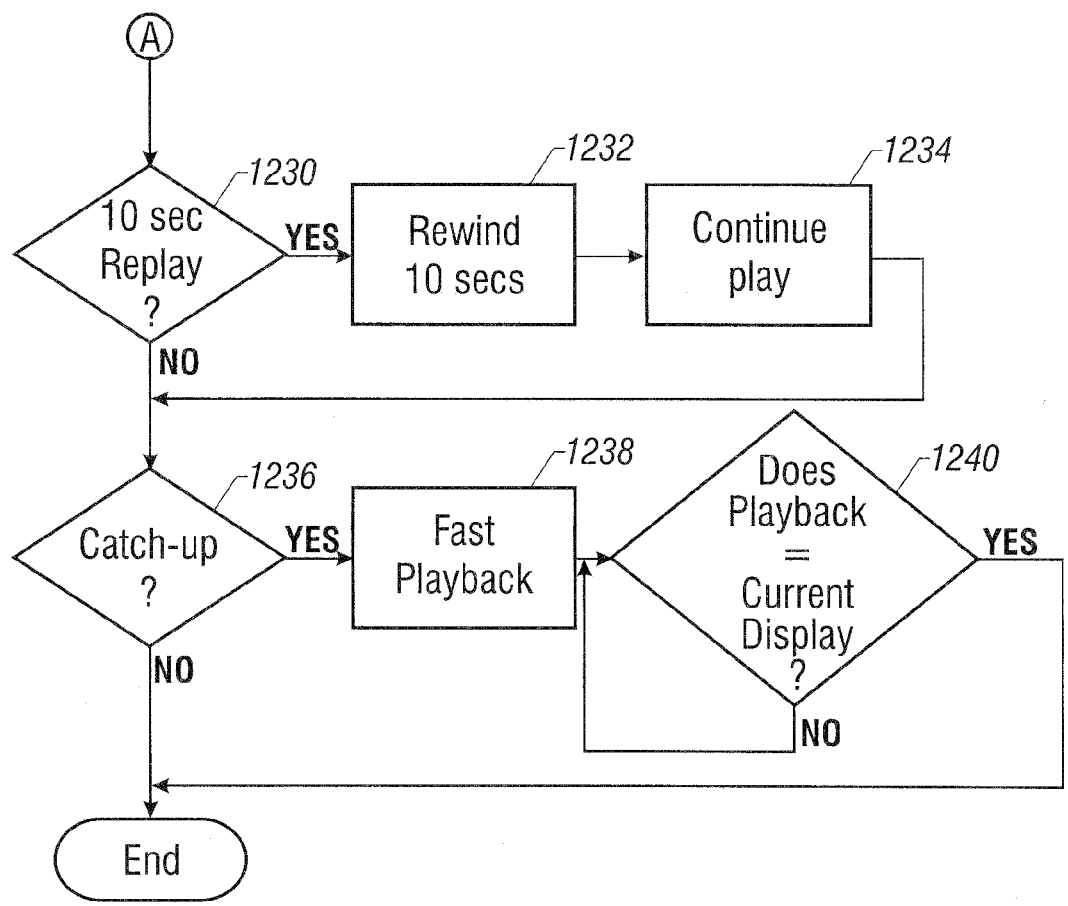
FIG. 12A is a continuation of the flow chart of FIG. 12.

Moving on to FIG. 12A, at diamond 1230 a check is done to see if the 10 second replay feature has been activated. If so, the storage device is operated to find the content which was recorded 10 seconds ago (block 1232). The recorded content is then played (block 1234) from the 10 second period back to present. This would correspond to the replay feature implemented with broadcast television sporting events. After the "rewind" and playback of 10 seconds has been completed, the system is automatically transferred to automatic play at the content that was recorded while the replay is being displayed so the user does not lose any continuity in the show. Of course, the user can set the amount of time for the replay to be something other than 10 seconds.

A catchup feature is checked (diamond 1236) and, if this feature has been selected, an accelerated playback option is implemented (as indicated in block 1238). In the accelerated playback, the playback may be slightly increased in speed, for example from 105 to 115% of actual speed, so the user can easily follow the program but can make up for lost time to get back into the program as broadcast. Once the recorded program catches up to the real-time program as indicated in diamond 1240, the catchup feature is completed and the user returns to real-time display. A conventional technique may be used to maintain audio pitch during accelerated playback.

Control over the record and playback functions may be implemented through a normal mouse function, for example, by clicking on icons as indicated in FIG. 11. In addition, the record and playback features may be controlled remotely even when the user is not proximate to a keyboard or mouse. This may be done using a conventional remote control operator which may, for example, utilize infrared radiation.

Figure 13:
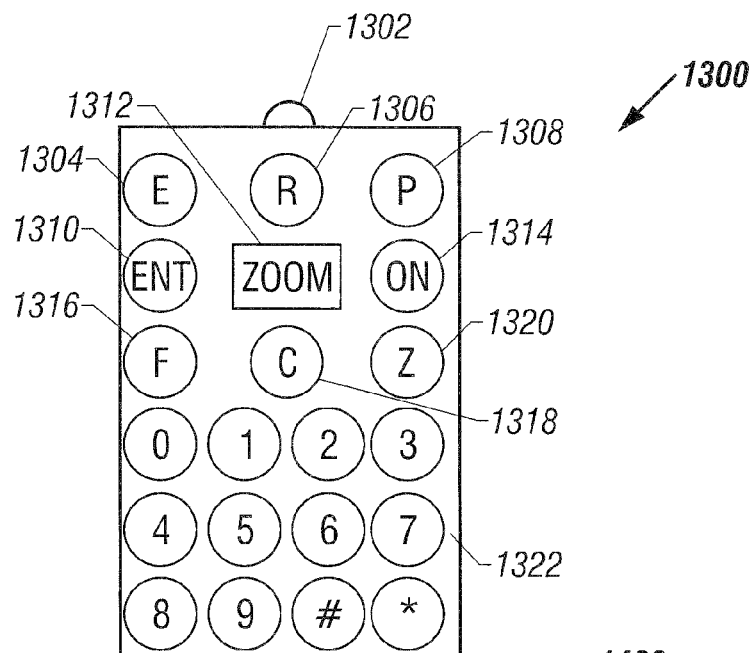
FIG. 13 is a top plan view of a remote control useful in one embodiment of the present invention.

As indicated in the depiction of an example of a system 1000 (FIG. 10), an infrared adapter 1040 may be provided, for example, in compliance with the standards and specifications (such as Infrared Data Association Serial Infrared Link Access Protocol Version 1.0, Jun. 23, 1994) of the Infrared Data Association (which can be found at {www.irda.org}). The remote control 1300, as shown in FIG. 13, may be utilized as a separate stand alone remote control or its features may be incorporated into a global remote control. The illustrated control 1300 is a stand alone control for control-ling the record and broadcast features. It includes an infrared transmission port 1302 and a plurality of buttons to control the various features. For example, a zoom function 1312 may be implemented as a four-way rocker switch. A zoom is implemented for the top quadrant of a display by pressing the upper edge of the button. If the button is pressed in the middle, the center quadrant is chosen for zoom. Likewise any of the remaining three edges of the zoom button can be operated to select a desired quadrant for zoom features.

A button 1306 is provided to implement the replay function, a button 1308 may implement the pause feature, and an enter button 1310 may be provided to allow entry of various information including a particular television program station. An on/off button 1314 may also be provided. Fast forward may be implemented by button 1316, an electronic program guide may be called by pressing button 1304. The catch up feature may be called by the button 1318, and a 10 second reply may be implemented by the button 1320. A conventional numeric keyboard 1322 may be provided to input additional information including selected television channels.

Figure 14:
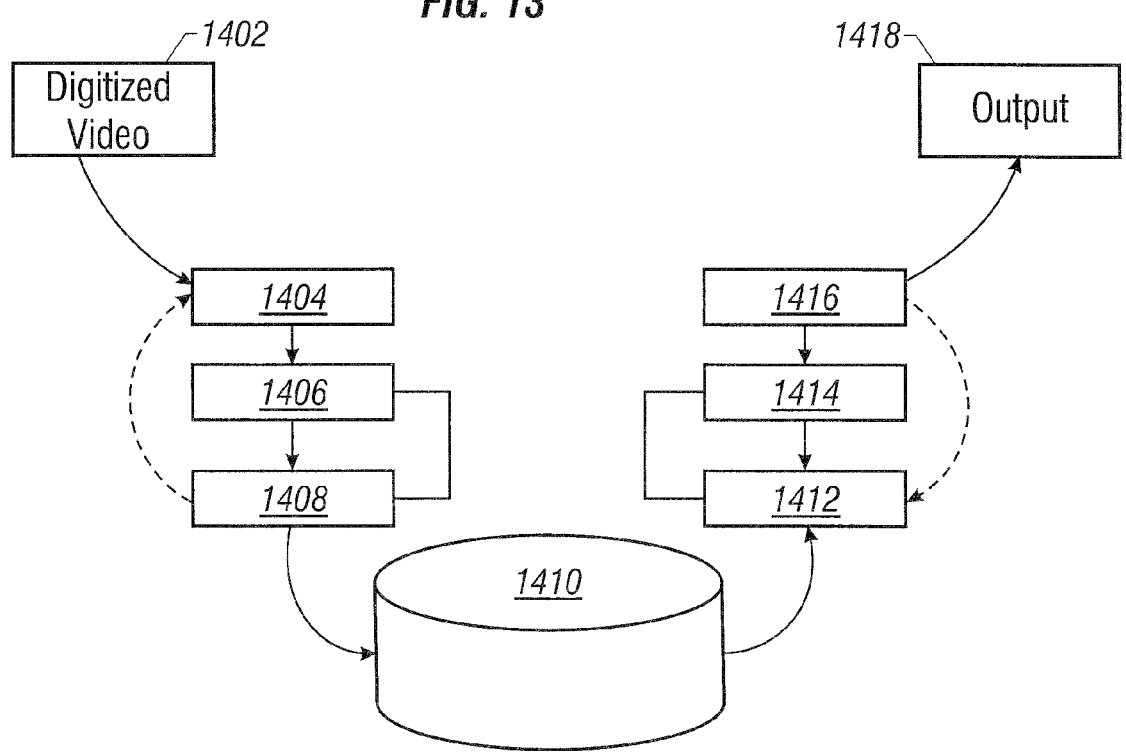
FIG. 14 is a block diagram showing how data is transferred to and from a memory device in accordance with one embodiment of the present invention.

Techniques for storing the video stream onto the storage device 1410 and for reading the information out of the storage device are summarized in Table 1 below and illustrated in FIGS. 14, 15, and 16. In FIG. 14, a schematic depiction of the storage system 1400 includes a digital storage device such as a hard disk drive 1410. The digitized video 1402 is initially stored in a buffer which is designated as being currently on the top of the memory stack. The transfer of information between the buffers and the storage device 1410 may be done in discrete time periods referred to herein as time steps.

TABLE 1

(X = no action)

| Buffers | Time Steps | | | | | | | | |
|---|---|---|---|---|---|---|---|---|---|
| | 1 | 2 | 3 | 4 | 5 | 6 | 7 | 8 | 9 |
| Input Storage | 1404 | 1408 | 1406 | 1404 | 1408 | 1406 | 1404 | 1408 | 1406 |
| Read | X | X | X | 1412 1414 | X | 1414 1416 | X | 1412 1416 | X |
| Write | X | X | 1404 1408 | X | 1404 1406 | X | 1406 1408 | X | 1404 1408 |
| Output | X | X | X | X | 1414 | 1412 | 1416 | 1414 | 1412 |

Figure 15:
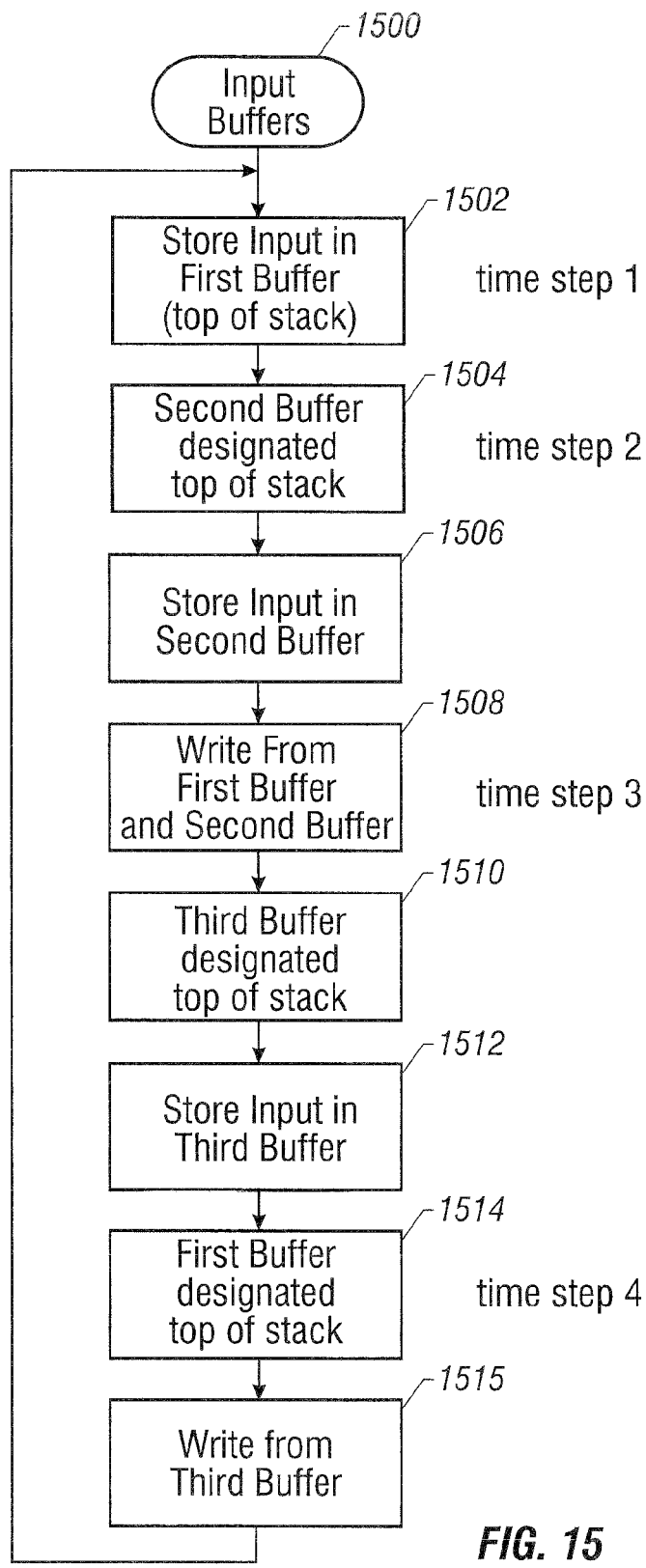
FIG. 15 is a flow chart showing the flow of input video information into a storage device in accordance with one embodiment of the present invention.

In a first time step, shown in FIG. 15, the digitized video 1402 (FIG. 14) is stored in memory buffer 1404 because that buffer is currently at the top of the memory stack, as indicated in block 1502 in FIG. 15.

As the buffer 1404 fills up, the buffer 1408 moves to the top of the stack (as indicated by the dashed arrow) and incoming video is stored in buffer 1408. As indicated in block 1504 in FIG. 15 in time step 2, the buffer 1408 replaces the buffer 1404 as the designated top of the stack buffer. The next input video is then stored in the new buffer (1408) as indicated in block 1506.

In time step 3 the buffer 1408 has filled up and the contents of buffers 1404 and 1408 are written to the storage device 1410 in a single write operation. During the same time step, buffer 1406 moves to the top of the stack and becomes the storage buffer for incoming video. This is illustrated in blocks 1508, 1510 and 1512 in FIG. 15.

In time step 4, the buffer 1404 moves back to the top of the stack to store incoming video since its previous content has already been saved in the storage device 1410. This is indicated in block 1514 of FIG. 15. Additionally, in time step 4, the content of buffer 1408 is written to the storage device 1410 as illustrated in block 1515. The storing of incoming information, as illustrated in FIG. 15 then cycles back to the top of the flow in FIG. 15 and continues in the same fashion thereafter.

The content from the storage device 1410 is then read into buffers 1412 and 1414 in time step 4 and block 1602.

In time step 5, the buffer 1408 moves to the top of the stack to store incoming video, and buffer 1414 moves to the top of the output stack and transfers data to the video output 1418. The contents of the buffers 1404 and 1406 are then written to the storage device 1410.

The time steps 1 to 5 illustrate a complete cycle from input to output. The remaining sequence of steps repeat starting at step 1 through 4 for the input of data and time steps 4 through 9 repeat for the output of data.

Figure 16:
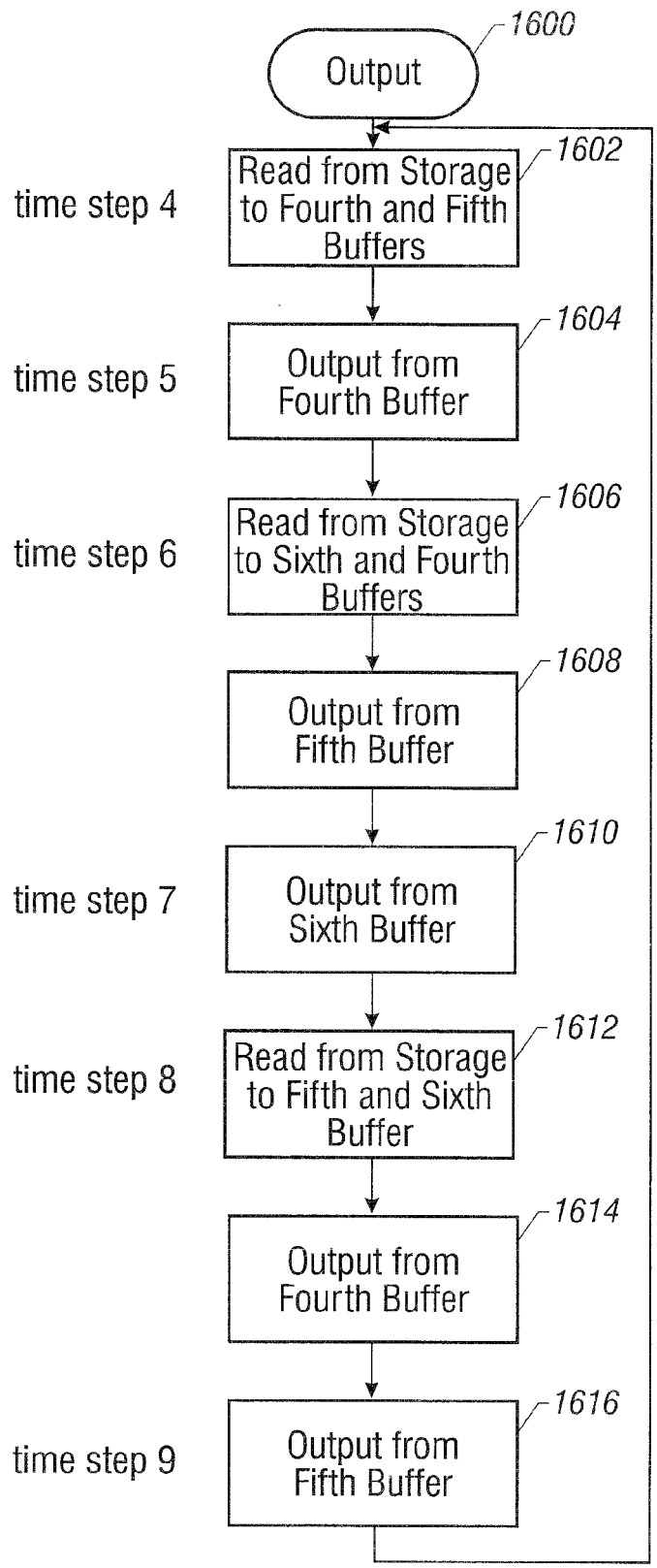
FIG. 16 is a flow chart showing the flow of data from the storage device in accordance with one embodiment of the present invention.

Referring now solely to FIGS. 14 and 16, in time step 6, information stored in the storage device is read to the sixth and fourth buffers (i.e., buffers 1414 and 1416) as indicated in block 1606. The contents of the fifth buffer (1412) are sent to the output port 1418.

In time step 7, the contents of the sixth buffer (which is buffer 1416) are sent to the output port 1418. No other output operations occur.

In time step 8, the contents from the storage device 1410 are read into the fifth and sixth buffers (buffers 1412 and 1416) as indicated in block 1612. Also the contents of the fourth buffer (buffer 1414) are passed to the output port 1418 as indicated in block 1614.

Finally, during time step 9 the contents of the fifth buffer (buffer 1412) are passed to the output port 1418, completing the cycle.

Using these techniques, the storage device is provided with enough time, through the operation of the buffers, to write the incoming video while supplying enough data simultaneously to the output display. Since the memory is used to make sure no content is dropped at the input end and the display is never starved at the output end, continuous display can be provided without losing information. In addition reading and writing larger chunks of data at one time reduces the amount of storage device head movement, thereby allowing the storage device to keep up with the read and write requests.

The size of the individual buffers 1404 to 1408 and 1412 to 1416 ("B") in megabytes is dependent at least in part on a number of factors including the input/output data rate "D", for example in megabytes per second, the effective bandwidth of the storage device when reading or writing "S", for example in megabytes per second, and the average seek time for the storage device per transaction "t", in microseconds. The time that it takes to fill up one memory buffer (B divided by D) is advantageously greater than the time it takes to read or write two memory buffers (2B divided by S) plus the average seek time (t):

$$\left(\frac{B}{D}\right) \geq \left(\frac{2B}{S}\right) + \left(\frac{t}{1000000}\right)$$

Solving for the minimum buffer size in the above equation yields the following equation which gives the minimum buffer size:

$$B \geq \left(\frac{DS}{S-2D}\right) \times \left(\frac{t}{1000000}\right)$$

A viewer can pause a season premier of a television while the station is still broadcasting in order to get up and answer the telephone. The user can resume watching the show after interruption as if the program were on video tape. In addition, while watching a sports event the user can rewind back to a controversial pass, replay the play in slow motion, stop at the exact instance when the catch was made and zoom in on the receiver. Also, the user can apply an image sharpening filter to see if both of the receiver's feet touched the ground before the receiver went out of bounds.

Timeshifting by substantially simultaneously recording and playing back a data stream enables the following type of benefits/features for an end-user. While watching the season premiere of a television show, the viewer can literally "pause" the program in order to get up and answer the phone or get a snack from the refrigerator. After the interruption, the viewer can resume watching again without having missed anything. If the viewer came home 15 minutes late for the show but had started recording the program from the beginning, the viewer can begin watching right away instead of waiting for the show to be over and then rewinding the cassette tape. Also the viewer can replay scenes during a "live" broadcast (e.g. season premiere of a show or sporting event) in case the viewer missed a line or an exciting play. In addition, while watching a sports event the user can rewind back to a controversial play, replay the play in slow motion, and stop at the exact instance when the catch was made. To get a better view, the viewer can zoom in on a portion of the screen and apply image sharpening filters to magnify one part of the screen.

Figure 18:
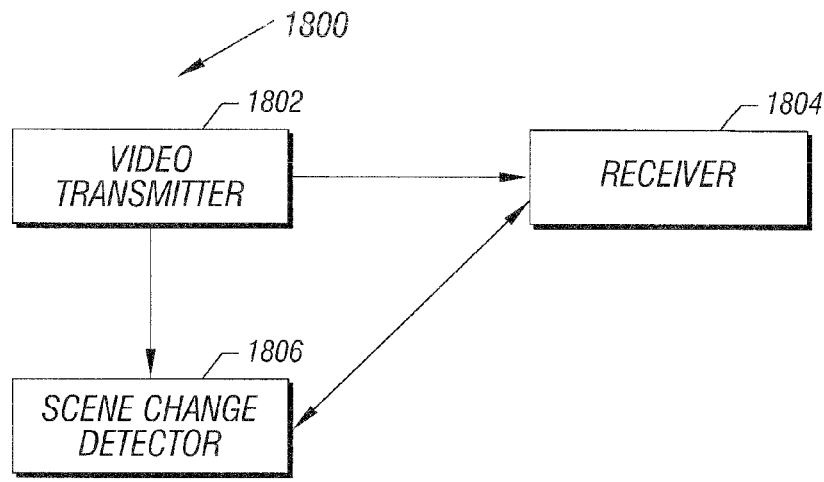
FIG. 18 is a block diagram of a video transmission system in accordance with one embodiment of the present invention.

An embodiment of a video transmission system 1800, shown in FIG. 18, includes a video transmitter 1802 which transmits video and associated audio to a plurality of receivers 1804. The video transmitter may transmit video content using a variety of transport media including television broadcast, cable distribution, satellite distribution, and computer networks. The scene change detector 1806 also receives the video transmission from the transmitter 1802. The scene change detector 1806 may be resident in the receiver 1804 or it may be separate entity, at a separate location, which provides scene change detection services for a number of different receivers 1804. In any case, the scene change detector 1806 may communicate in a two-way communication with the receiver 1804.

The receiver 1804 may request scene change detection information from the scene change detector 1806. A shot is what is captured between a record and stop camera operation. A scene is a sequence of contiguous shots unified by a common location or event. The technology for implementing a scene change detector is well known in the industry. A conventional scene change detector 1806 may be utilized or, if desired, a modified scene change detector may be implemented in accordance with an embodiment of the present invention described hereinafter.

Figure 19:
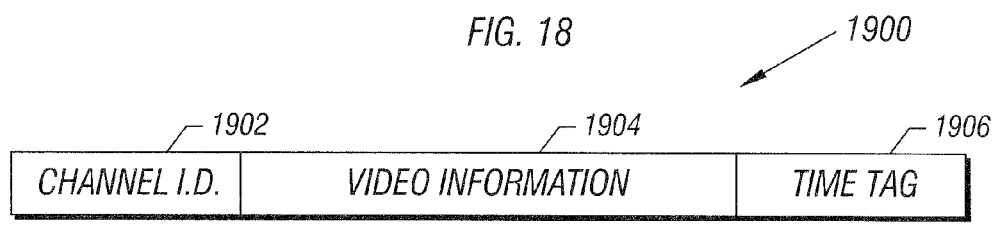
FIG. 19 is a depiction of a video file associated with a given broadcast channel.

The received video information, stored on the receiver 1804, may have the file 1900 format shown in FIG. 19. Namely, the video information 1904 may be stored in a file 1900 together with time tag information 1906 and a channel identifier 1902. Thus, the video information is identifiable both by the channel identifier of the channel on which it was received and the local time when it was received, in one embodiment of the present invention.

Figure 20:
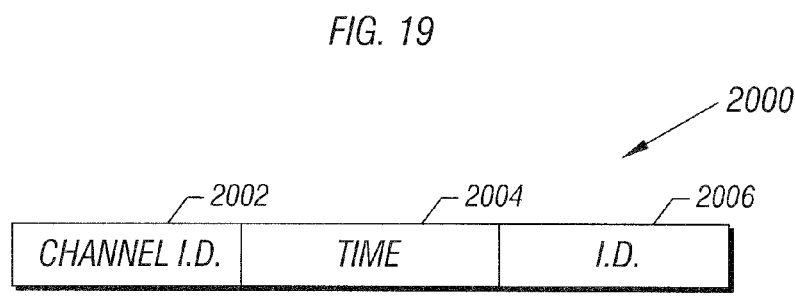
FIG. 20 is a depiction of a request to a scene change detector for scene change information.

The receiver 1804 may request scene change information from the scene change detector 1806 by making a request in the format illustrated in FIG. 20 in one embodiment of the present invention. The request 2000 may include an identifier 2002 for the channel on which the desired scene change information is provided, information about the time of the program 2004 and an identifier 2006 to identify the requesting receiver.

Figure 21:
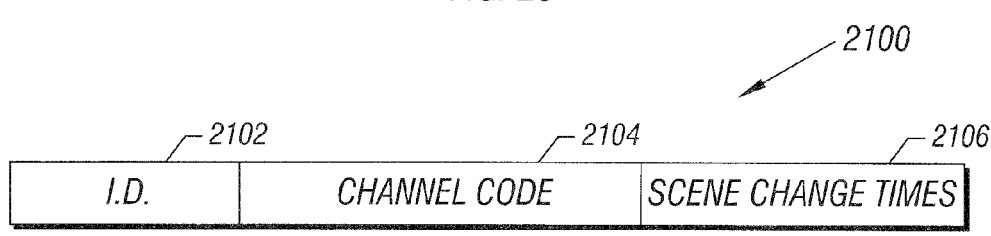
FIG. 21 is a depiction of a response to a request for scene change information.

The scene change detector 1806 may respond, for example, by sending a file 2100 in the format, shown in FIG. 21, including an identifier 2102 to identify the appropriate receiver 1804 which made the request for scene change information. A channel code 2104 may be included together with a plurality of scene change times 2106.

Thus, for a given channel and program, the scene change detector 1806 may provide a very compact amount of information sufficient to locate scene changes in the received video. In particular, the scene change detector 1806 may provide the times in minutes and seconds at which each scene change occurs. The receiver 1804 may then use this information to retrieve the particular scenes. For example, the receiver 1804 may create and display a storyboard including a frame representative of each detected scene so that a particular scene may be identified.

Figure 22:
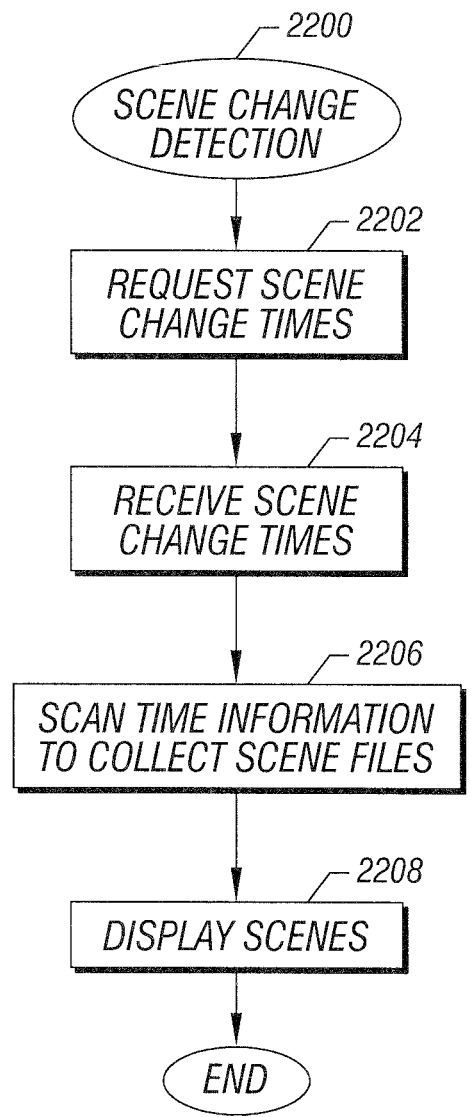
FIG. 22 is a depiction of software that may be used by the receiver shown in the system of FIG. 18.

Referring next to FIG. 22, the scene change detection software 2200, stored in the receiver 1804, may initially request scene change times, as indicated in block 2202. The request may be in the format indicated in FIG. 20, for example. The scene change times are received from the scene change detector as indicated in block 2204. The response may be in the format indicated in FIG. 21, for example. The time information 2106 is scanned and used to collect the corresponding stored video files, as indicated in block 2206. The files may be in the format indicated in FIG. 19 in one embodiment of the present invention. For example, the time tags 1906 may be matched to the scene change times 2106.

The various scenes associated with the files 1900 may be displayed for example in a storyboard fashion, as indicated in block 2208. Alternatively, a plurality of sequential scenes may be displayed and the user may scroll the display to see prior or subsequent scenes.

Figure 23:
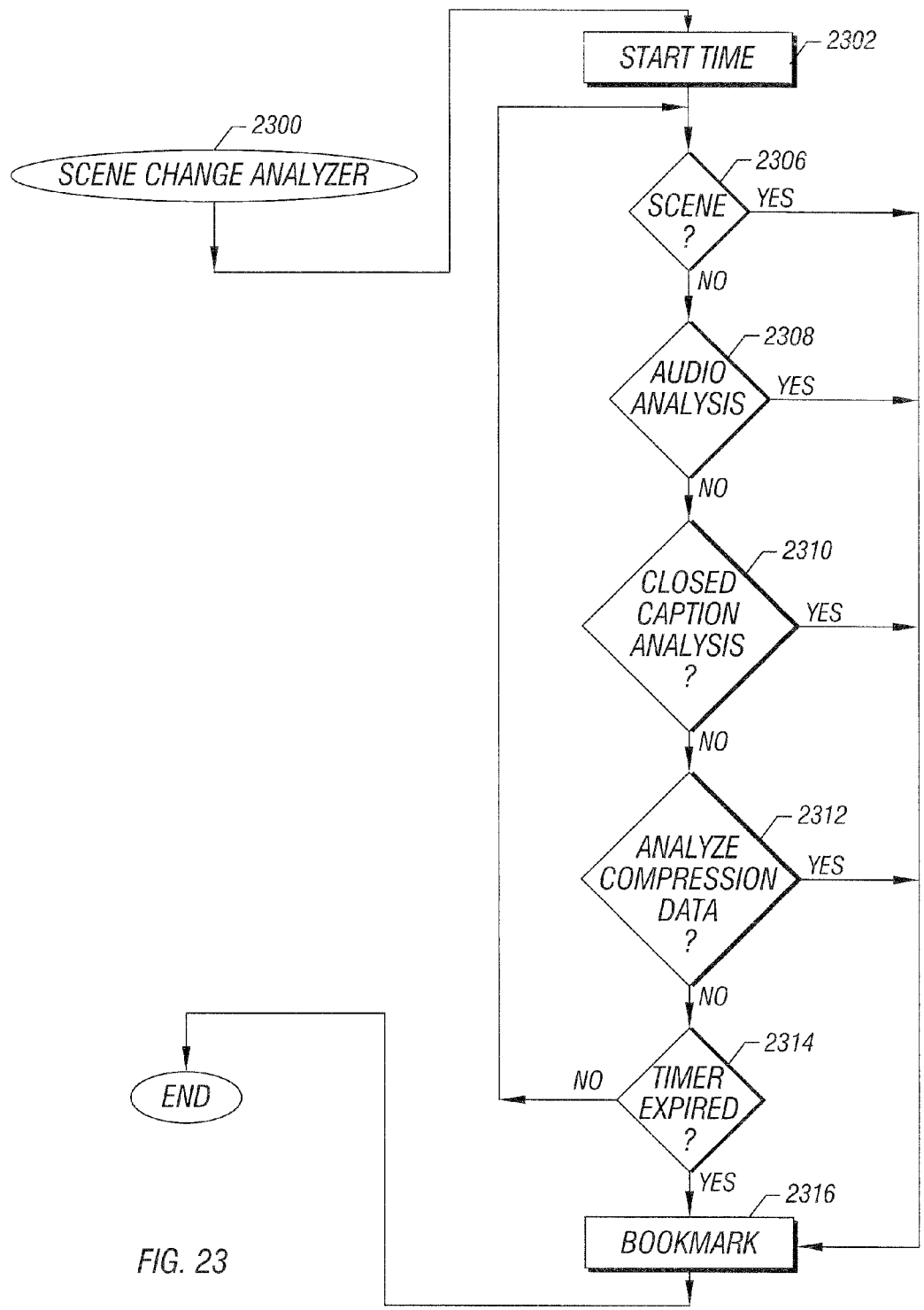
FIG. 23 is a flow chart for a scene change detector in accordance with one embodiment of the present invention.

Referring now to FIG. 23, the scene change analyzer which may be utilized to implement the scene change detector 1806 in accordance with one embodiment of the present invention may use the software 2300. Initially a timer may be started, as indicated in block 2302. Then a check at diamond 2306 determines whether a particular scene can be identified using conventional techniques. If so, the scene if bookmarked, and the bookmark is stored as indicated in block 2316. If not, an analysis of the audio track may be utilized to identify scene change information, as indicated in diamond 2308.

For example, a change in the subject matter of the audio dialog may be utilized to identify scene changes. In one embodiment of the present invention, in a conventional news program, the same announcer may be present in a number of frames. Using video analysis alone, it may be difficult to identify a scene change. However, by analyzing the audio information, it may be possible to determine when a subject matter change has occurred. This audio analysis may be done by identifying changes in tone, pace and quiet times.

Alternatively, an analysis of a closed caption script may be implemented at diamond 2310. The actual words utilized in the ongoing dialog may be analyzed to identify that a new set of words are being utilized. This information may be then used to identify a scene change.

Finally, if none of the other techniques have been successful, digital video compression data may be analyzed to locate scene changes. In conventional compression algorithms such as the Moving Pictures Experts Group (MPEG-2) compression algorithm, one can analyze each of the frames to determine where scene changes occur. For example, I-frames or "intra" frames are coded as stand-alone still images. They generally are used at scene cuts. However, P and B frames may also provide useful information. MPEG-2 refers to International Organization for Standardization (ISO) and International Electrotechnical Commission (IEC) Standard 13818-1 (Systems), 13818-2 (video), 13818-3 (audio) and 13818-4 (compliance) (1994). Normally, compression algorithms compress data, such as video data, by finding scene changes and using that information to compress the information which must be stored. Information about discontinuities in the spatial domain may be extracted and used to identify scene changes in an expeditious fashion for display purposes. See B. L. Yeo and B. Liu, "Rapid Scene Analysis on Compressed Video," IEEE Trans. on Circuits for Video Technology, Vol. 5, No. 6, December 1995.

If none of the techniques is successful after a sufficient number of tries, the timer eventually expires, as indicated at diamond 2314. A shot is then chosen, based on the passage of time, as a scene change and a bookmark is applied to that scene. Thus, if the algorithm is unable to identify a scene change, after a sufficient time has passed, a shot is simply chosen as a representative scene change and the flow ends.

Figure 24:
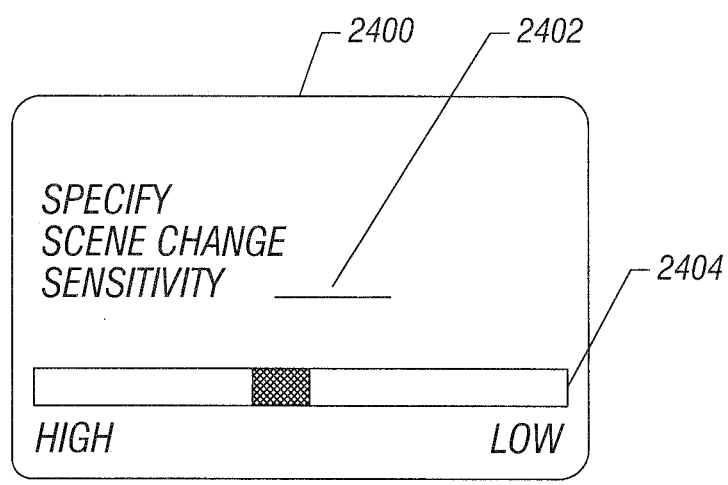
FIG. 24 is a graphical user interface that may be used in connection with a scene change detector.

In some cases, users may desire to have a large number of representative scenes. Thus, they may desire a relatively high scene change detection sensitivity. Other users may be less desirous of such a detailed report and may prefer a lower sensitivity. FIG. 24 shows a graphical user interface 2400 which may be utilized to allow the user to input information into the receiver 1804 about the desired scene change sensitivity in one embodiment of the present invention. The user can implement a scene change rating at the data entry point 2402, or a sliding scale 2404 may be adjusted to indicate the level of sensitivity that is desired. The level of sensitivity may be entered to request more or less selectivity in identifying scene changes or to increase the time of the timer used in block 2302 in FIG. 23.

The video information received by the receiver 1804 may be in analog or digital formats in accordance with modern video transmission protocols. For example, digital format television broadcasts are available under a variety of different digital standard including the Advanced Television Systems Committee (ATSC) Digital Television Standard, issued on Sep. 15, 1995, as one example. Thus, it is advantageous to detect whether incoming video is in one of the digital formats. For example, if the information is already in digital format, compression is not necessary before storage. However, if the information is in an analog format, it may be desirable to convert the information to a digital format and then to compress the information.

Figure 25:
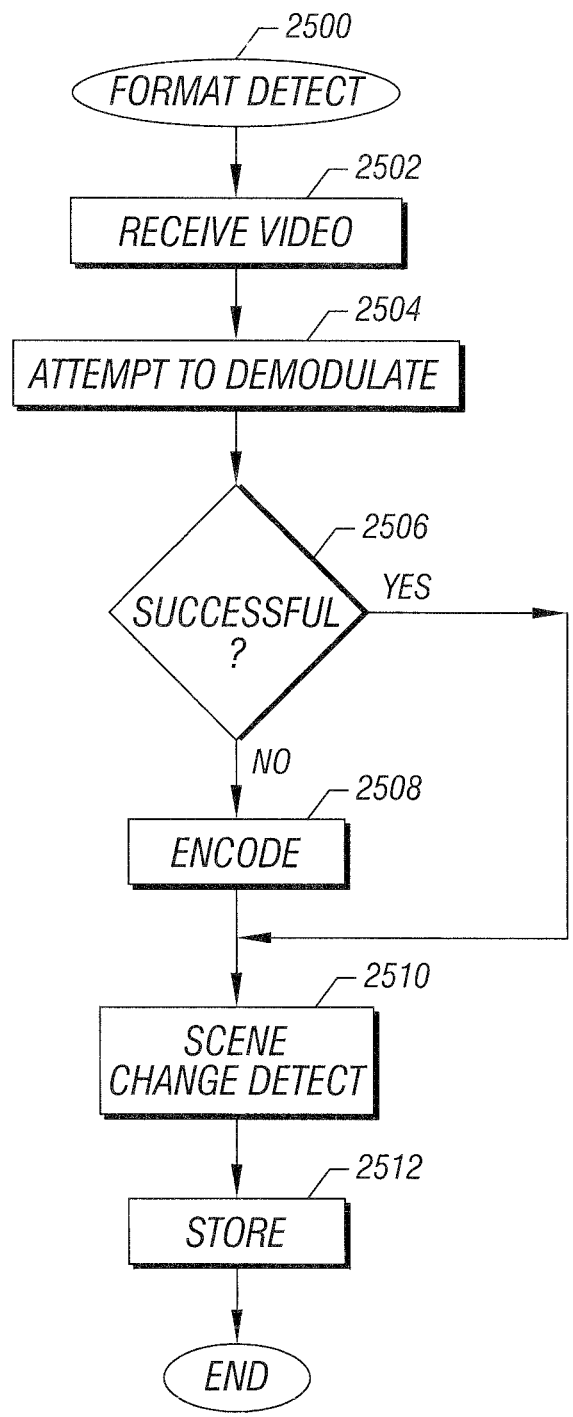
FIG. 25 is a flow chart for detecting whether information received from a video transmitter is in a digital or analog format and for processing that information for storage.

One technique for handling dual mode (analog or digital) data, uses the software 2500 illustrated in FIG. 25. Incoming video is received as indicated in block 2502. An attempt is made to demodulate the incoming video as indicated in block 2504. If the information uses vertical side band modulation (VSB) with 8 (terrestrial) or 16 (high data rate) discrete amplitude levels (8 VSB and 16 VSB) it is a digital transmission and can be demodulated. If this attempt is successful, as determined at diamond 2506, it can be assumed safely that the data is digital. In such case, it is not necessary to encode and compress the information. If the attempt is unsuccessful, the information may be assumed to be analog, and in such case, the information an be converted to a digital format and compressed as indicated in block 2508. Regardless of its format, the incoming data is subjected to a scene change detection analysis as indicated in block 2510 and then stored as indicated at 2512.

Figure 26:
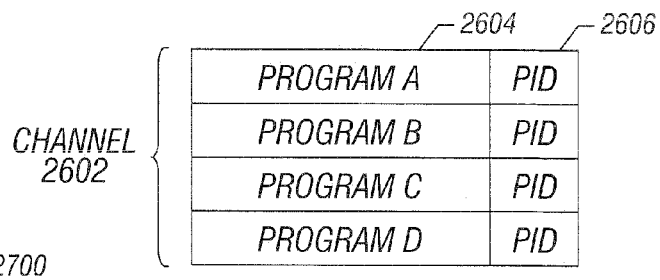
FIG. 26 is a depiction of a channel in a digital video distribution system.

In some digital broadcast protocols, such as the ATSC standard cited earlier, more than one video program may be transmitted in a given channel. Thus, referring to FIG. 26, a channel 2602 may include up to four programs 2604. Each program may have associated with it a program identifier 2606. This enables selection of one program over another.

Figure 27:
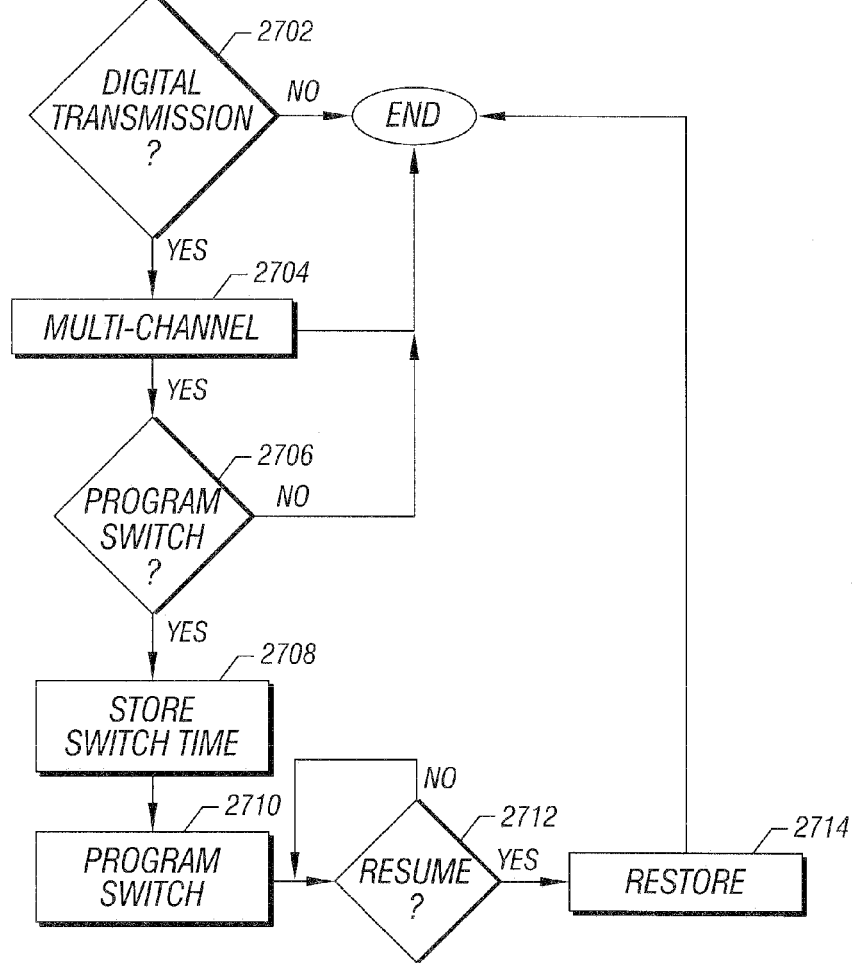
FIG. 27 is a flow chart for allowing an intrachannel jump between programs on a single channel in a digital video distribution system.

Thus, in one embodiment of the present invention, it is possible to jump between viewing any of the programs in a given channel since all four programs may be stored automatically. Referring to FIG. 27, the software 2700 initially determines whether a given transmission is a digital transmission (diamond 2702). If not, it can be assumed that there is only one program per channel. Otherwise, a determination is made a diamond 2704 whether there are actually multiple programs in a given channel. If so, a check at diamond 2706 determines whether the user has indicated a desire to implement a program switch from one program to another. A program switch may be entered using a graphical user interface as one example. When a program switch command is received, the switch time may be stored as indicated in block 2708. Next, the program is switched within the same channel by feeding the appropriate stored information such as the program identifier 2606 of the desired program 2604.

When the user wishes to resume to the prior program, as indicated at diamond 2712, the restoration, implemented at block 2714, uses the stored switch time to identify a return point in the prior program. In this way, the user can watch one program in the same channel, switch to another program, return to the original program and, using the catch-up feature, may catch back up to real time, by knowing where the viewer left the prior program. The user can jump, for example using a remote control unit, between the various programs even within the same channel.

Where analog or digital video information is received, it is desirable to avoid to the greatest possible extent, decompressing the received video in order to detect scene changes and recompressing the video in order to store it in accordance with the principles described herein. By using the so-called DC images, it is possible to extract sufficient information to determine where shots or scene changes occur without completely decompressing the video.

Figure 28:
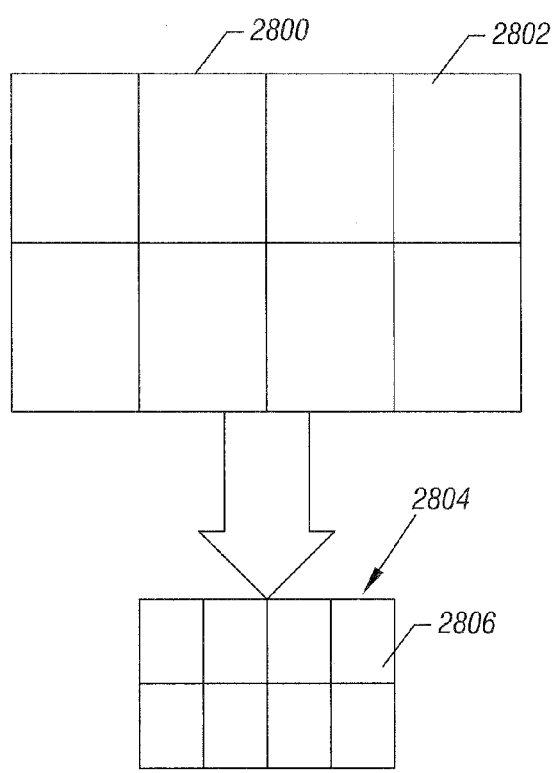
FIG. 28 is a schematic depiction of the relationship between a frame and a DC image.

DC images are spatially reduced versions of the original images. For example, referring to FIG. 28, the original image 2800 in digital format may have data corresponding to eight blocks 2802. The DC image 2804 may have spatially reduced versions 2806 of the same eight blocks. Generally an image may be divided into blocks of N by N pixels. The (i, j) pixel of the DC image is the average value of the (i, j) block of the original image. Sequences formed in such a manner may be called DC sequences. For example, an original image of 320 by 240 pixels may have a DC image of 40 by 30 pixels using N equal 8 as illustrated in FIG. 28.

The smaller data size of the DC image makes it more reasonable to process every frame in a video sequence. The DC sequence may then be processed, for example in one embodiment of the present invention, using three different detection algorithms, one which detects abrupt changes, one that detects plateaus and one that detects flashlights. See B. L. Yeo and B. Liu, "Rapid Scene Analysis on Compressed Video", IEEE Trans. on Circuits and Systems for Video Technology, Vol. 5, No. 6, December 1995.

The DC image is derived from a discrete cosign transform (DCT) based and motion compensated DCT-based compression techniques such as motion JPEG and MPEG. The same principles of first extracting only reduced resolution images and then using said reduced images for processing purposes applies to many other compression formats including those of Radius, Cinepak, Intel's Indeo, subband/wavelet based compression and the like.

By using DC images and DC sequences for shot or scene change analysis, the operations are performed directly on compressed data, eliminating the need for full frame decompression. In addition, because only a small fraction of the original data is used, the computational complexity may be reduced. See the previously cited Yeo and Liu paper. In some instances, the P and B frames alone may yield DC images that are very close to the actual images. The computational cost per DC coefficient in P and B frames is reduced to four multiplications.

Figure 29:
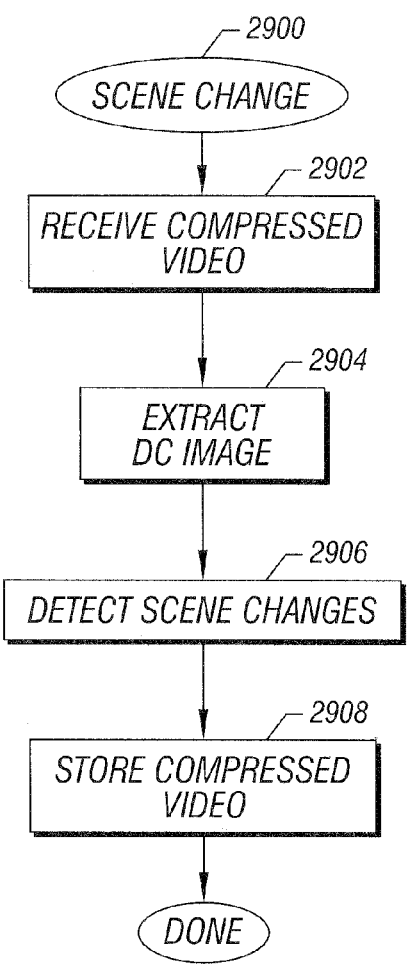
FIG. 29 is a flow chart for software for handling detecting scene changes without full frame decompression.

Referring to FIG. 29, a software flow 2900 for extracting the information needed to detect shots or scene changes in compressed digital video begins by receiving the compressed video as indicated in block 2902. The DC image is extracted (block 2904) and the shot or scene change information may be determined from any combination of P, B or I-frame information as explained in the cited Yeo paper. The compressed video is then stored as described in connection with the present invention.

Because there is no need to decompress the data, the speed of storage may be greatly increased and the computational complexity may be reduced. This facilitates a system which substantially simultaneously records and plays back a data stream, of the type described herein, since large amounts of data may be stored at one time and the resources of the system may be taxed in undertaking this process. The additional burden of extracting the scene change information may tend to slow this process down. By simplifying the shot or scene change detection process through the use of DC images, the computational complexity and thus the speed may be improved.

Thus, an embodiment of a method of substantially simultaneously recording and playing back a time-shifted video stream in accordance with the invention is disclosed. The specific arrangements and methods described herein are merely illustrative of the principles of this invention. For example, a similar embodiment may be used to store and retrieve other types of data streams besides video streams. Numerous modifications in form and detail may be made without departing from the scope of the described invention. Although this invention has been shown in relation to a particular embodiment, it should not be considered so limited. Rather, the described invention is limited only by the scope of the appended claims.

What is claimed is:

1. A method for identifying whether digital or analog video information has been received comprising:
   attempting to demodulate the information using a digital technique; and
   based on the results of the demodulation attempt, determining the format of said information.

2. The method of claim 1 wherein attempting to demodulate the information includes using a vertical side band demodulation technique to demodulate the information.

3. The method of claim 1 further including converting analog information to digital information.

4. The method of claim 3 further including compressing said digital information.

5. The method of claim 1 further including determining whether a plurality of programs have been broadcast on a single channel.

6. The method of claim 5 further including automatically storing each of said programs broadcast on a single channel.

7. An article comprising a non-transitory computer readable medium for storing instructions that cause a processor-based system to:
   attempt to demodulate received digital or analog video information using a digital technique; and based on the results of said demodulation attempt, determine the format of said information.

8. The article of claim 7, including instructions to attempt to demodulate the information by using a vertical side band demodulation technique to demodulate the information.

9. The article of claim 7 further storing instructions to convert analog information to digital information.

10. The article of claim 9 further storing instructions to compress said digital information.

11. The article of claim 10 further storing instructions to determine whether a plurality of programs have been broadcast on a single channel.

12. The article of claim 11 further storing instructions to automatically store each of said programs broadcast on a single channel.

* * * * *